United States Patent
Chen et al.

(10) Patent No.: US 10,212,048 B2
(45) Date of Patent: Feb. 19, 2019

(54) SERVICE OFFLOADING METHOD, DEVICE, AND SYSTEM

(71) Applicant: Huawei Technologies Co., Ltd., Shenzhen (CN)

(72) Inventors: Xiao Chen, Shenzhen (CN); Tianle Deng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 253 days.

(21) Appl. No.: 15/015,863

(22) Filed: Feb. 4, 2016

(65) Prior Publication Data
US 2016/0182313 A1    Jun. 23, 2016

Related U.S. Application Data

(63) Continuation of application No. PCT/CN2013/081158, filed on Aug. 9, 2013.

(51) Int. Cl.
| | |
|---|---|
| *H04W 36/22* | (2009.01) |
| *H04L 12/24* | (2006.01) |
| *H04W 28/24* | (2009.01) |
| *H04W 48/18* | (2009.01) |
| *H04W 84/12* | (2009.01) |

(52) U.S. Cl.
CPC ......... *H04L 41/5009* (2013.01); *H04W 28/24* (2013.01); *H04W 48/18* (2013.01); *H04W 84/12* (2013.01)

(58) Field of Classification Search
CPC ...... H04W 28/24; H04W 48/18; H04W 84/12
USPC ......... 455/419, 436, 449, 453; 370/230, 328
See application file for complete search history.

(56) References Cited

U.S. PATENT DOCUMENTS

| | | | |
|---|---|---|---|
| 2008/0037552 | A1 | 2/2008 | Dos Remedios et al. |
| 2014/0079007 | A1 | 3/2014 | Li et al. |
| 2015/0201373 | A1 | 7/2015 | Fu et al. |

FOREIGN PATENT DOCUMENTS

| | | | |
|---|---|---|---|
| CN | 101959252 A | 1/2011 | |
| CN | 102215530 A | 10/2011 | |
| CN | 103202060 A | 7/2013 | |

*Primary Examiner* — Sam Bhattacharya
(74) *Attorney, Agent, or Firm* — Leydig, Voit & Mayer, Ltd.

(57) ABSTRACT

The present application provides a service offloading method, a device, and a system, and relate to the mobile communications field. The method includes: sending attribute information of a first network to a network controller of a second network, where the attribute information includes identity information of the first network or a combination of identity information and status information of the first network; sending quality information of service to the network controller of the second network, receiving the service offloading indication fed back by the network controller; and selecting, according to the received service offloading indication, a bearer network for a service requested by user equipment, thereby achieving an effect that the network controller of the second network can perform service offloading appropriately according to a network status of the first network, the network status of the second network, and the quality information of service, so as to improve network utilization.

20 Claims, 12 Drawing Sheets

SERVICE OFFLOADING METHOD, DEVICE, AND SYSTEM

CROSS-REFERENCE TO RELATED APPLICATIONS

This application is a continuation of International Patent Application No. PCT/CN2013/081158, filed on Aug. 9, 2013, which is hereby incorporated by reference in its entirety.

TECHNICAL FIELD

Embodiments of the present invention relate to the mobile communications field, and in particular, to a service offloading method, a device, and a system.

BACKGROUND

With development of mobile communications technologies, there are more applications in a terminal and there are more terminals, and correspondingly, the terminal has increasingly higher requirements on a transmission capacity of a wireless network. To satisfy the requirements on the transmission capacity of the wireless network, deploying a cost-effective WLAN (wireless local area network) in a 3GPP (3rd Generation Partnership Project) network is a main technical solution used by a mobile operator to resolve the capacity problem.

However, because the WLAN cannot well ensure QoS (quality of service) of a service, and a service having a relatively high requirement on QoS assurance may be interrupted because the WLAN network is busy, which cannot ensure quality of service, how to perform service offloading in an area in which both the WLAN network and the 3GPP network are deployed is one of the most important research subjects for a person skilled in the art.

An existing service offloading method includes: user equipment pre-saves a service offloading rule; and when initiating a service, the user equipment selects a 3GPP network or a WLAN network according to the service offloading rule, to bear the service, where the service offloading rule specifies a bearer network corresponding to each type of service. For example, to ensure quality of service of a video service, the service offloading rule specifies: when WIFI (wireless fidelity) is in an enabled state, the user equipment enables the 3GPP network to bear the initiated video service, and enables the WLAN to bear a web page browsing service that does not have a high requirement on quality of service; when the WIFI is in a disabled state, all services initiated by the user equipment are borne by the 3GPP network; when the WIFI is in an enabled state and the user equipment requests web page browsing, the user equipment may select the WLAN to bear the web page browsing service.

During the implementation of the present invention, the inventor finds that the existing solution has at least the following problems:

Because a bearer network is selected, by using a preset service offloading rule, for a service initiated by user equipment, the existing service offloading method cannot well adapt to changes of a wireless environment. In this case, one network may have excessive load while the other network may have empty load, causing a low network utilization problem.

SUMMARY

To resolve a problem that because an existing service offloading method cannot well adapt to changes of a wireless environment, network utilization is low, embodiments of the present invention provide a service offloading method, a device, and a system. The technical solutions are as follows:

According to a first aspect, a service offloading method is provided, where the service offloading method is applied to user equipment accessing a first network, and the method includes:

sending attribute information of the first network to a network controller of a second network, where the attribute information includes identity information of the first network or a combination of identity information and status information of the first network;

sending quality information of service to the network controller of the second network, where the quality information of service includes a correspondence between a quality of service parameter and a service, so that the network controller performs service offloading according to the received attribute information and the received quality information of service and a network status of the second network, and feeds back a service offloading indication, where the service offloading indication is used to indicate a network bearing a service requested by the user equipment;

receiving the service offloading indication fed back by the network controller; and selecting, according to the received service offloading indication, a bearer network for a service requested by the user equipment.

In a first possible implementation manner of the first aspect, the sending attribute information of the first network to a network controller of a second network includes:

sending the attribute information of the first network to the network controller of the second network in a process of establishing a connection to the network controller.

With reference to the first possible implementation manner of the first aspect, in a second possible implementation manner, the first network is a wireless local area network, the second network is a 3rd generation partnership project 3GPP network, and the sending attribute information of the first network to a network controller of a second network includes:

sending a connection establishment request carrying the attribute information to the network controller, where the connection establishment request is used to request establishment of a wireless control connection between the user equipment and the network controller; or sending an acknowledgement carrying the attribute information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a third possible implementation manner of the first aspect, the first network is a wireless local area network, the second network is a 3GPP network, and before the sending attribute information of the first network to a network controller of a second network, the method further includes:

sending preset indication information to the network controller, where the preset indication information is used to instruct the network controller to request the attribute information from the user equipment, so that after receiving the preset indication information, the network controller sends, according to the preset indication information, an information request used to request the attribute information;

receiving the information request sent by the network controller; and after receiving the information request, triggering the user equipment to send the attribute information of the first network to the network controller of the second network.

With reference to the third possible implementation manner of the first aspect, in a fourth possible implementation manner, the sending preset indication information to the network controller includes:

sending a connection establishment request carrying the preset indication information to the network controller, where the connection establishment request is used to request establishment of a wireless control connection between the user equipment and the network controller; or sending an acknowledgement carrying the preset indication information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

With reference to the first aspect, the first possible implementation manner, the second possible implementation manner, the third possible implementation manner, or the fourth possible implementation manner of the first aspect, in a fifth possible implementation manner, the identity information includes an IP address and/or a MAC address of an access point of the first network; and the status information includes at least one of a service set identifier, security configuration information, a measurement report, load information, and a supported maximum rate.

According to a second aspect, a service offloading method is provided, where the service offloading method is applied to a network controller of a second network, and the method includes:

receiving attribute information of a first network sent by user equipment, where the attribute information includes identity information of the first network or a combination of identity information and status information of the first network;

receiving quality information of service sent by the user equipment, where the quality information of service includes a correspondence between a quality of service parameter and a service; and performing service offloading according to the received attribute information and the received quality information of service and a network status of the second network, and feeding back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment.

In a first possible implementation manner of the second aspect, the receiving attribute information of a first network sent by user equipment includes:

receiving, in a process of establishing a connection to the user equipment, the attribute information of the first network sent by the user equipment.

With reference to the first possible implementation manner of the second aspect, in a second possible implementation manner, the first network is a wireless local area network, the second network is a 3GPP network, and the receiving attribute information of a first network sent by user equipment includes:

receiving a connection establishment request that carries the attribute information and is sent by the user equipment, where the connection establishment request is used to request establishment of a wireless control connection between the user equipment and the network controller; or receiving an acknowledgement that carries the attribute information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a third possible implementation manner of the second aspect, the first network is a wireless local area network, the second network is a 3GPP network, and before the receiving attribute information of a first network sent by user equipment, the method further includes:

receiving preset indication information sent by the user equipment, where the preset indication information is used to instruct the network controller to request the attribute information from the user equipment; and sending, according to the preset indication information, an information request used to request the attribute information, so that the user equipment receives the information request sent by the network controller, and after receiving the information request, sends the attribute information to the network controller.

With reference to the third possible implementation manner of the second aspect, in a fourth possible implementation manner, the receiving preset indication information sent by the user equipment includes:

receiving a connection establishment request that carries the preset indication information and is sent by the user equipment, where the connection establishment request is used to request establishment of a wireless control connection between the user equipment and the network controller; or receiving an acknowledgement that carries the preset indication information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

With reference to the second aspect, the first possible implementation manner, the second possible implementation manner, the third possible implementation manner, or the fourth possible implementation manner of the second aspect, in a fifth possible implementation manner, the performing service offloading according to the received attribute information and the received quality information of service and a network status of the second network includes:

offloading, according to the received attribute information and the received quality information of service and the network status of the second network, a service corresponding to a quality of service parameter less than a preset threshold onto the first network; and/or offloading, according to the received attribute information and the received quality information of service and the network status of the second network, a service corresponding to a quality of service parameter greater than a preset threshold onto the second network.

With reference to the second aspect, the first possible implementation manner, the second possible implementation manner, the third possible implementation manner, the fourth possible implementation manner, or the fifth possible implementation manner of the second aspect, in a sixth possible implementation manner, the identity information includes an IP address and/or a MAC address of an access point of the first network; and the status information includes at least one of a service set identifier, security configuration information, a measurement report, load information, and a supported maximum rate.

With reference to the sixth possible implementation manner of the second aspect, in a seventh possible implementation manner, if the attribute information received by the network controller includes the identity information, before the performing service offloading according to the received attribute information and the received quality information of service and a network status of the second network, the method further includes:

sending request information to the access point of the first network according to the received identity information, so that after receiving the request information, the access point of the first network sends feedback information, where the feedback information includes at least one of a service set identifier, security configuration information, a measurement report, load information, and a supported maximum rate; and receiving the feedback information sent by the access point of the first network; and the performing service offloading according to the received attribute information and the received quality information of service and a network status of the second network includes:

performing service offloading according to the received identity information and the received quality information of service that are sent by the user equipment, the received feedback information sent by the access point of the first network, and the network status of the second network.

According to a third aspect, user equipment is provided, where the user equipment accesses a first network, and the user equipment includes:

a first sending module, configured to send attribute information of the first network to a network controller of a second network, where the attribute information includes identity information of the first network or a combination of identity information and status information of the first network;

a second sending module, configured to send quality information of service to the network controller of the second network, where the quality information of service includes a correspondence between a quality of service parameter and a service, so that the network controller performs service offloading according to the received attribute information and the received quality information of service and a network status of the second network, and feeds back a service offloading indication, where the service offloading indication is used to indicate a network bearing a service requested by the user equipment;

an indication receiving module, configured to receive the service offloading indication fed back by the network controller; and a network selection module, configured to select, according to the service offloading indication received by the indication receiving module, a bearer network for a service requested by the user equipment.

In a first possible implementation manner of the third aspect, the first sending module is further configured to send the attribute information of the first network to the network controller of the second network in a process of establishing a connection to the network controller.

With reference to the first possible implementation manner of the third aspect, in a second possible implementation manner, the first network is a wireless local area network, the second network is a 3GPP network, and the first sending module includes:

a first sending unit or a second sending unit, where the first sending unit is configured to send a connection establishment request carrying the attribute information to the network controller, where the connection establishment request is used to request establishment of a wireless control connection between the user equipment and the network controller; or the second sending unit is configured to send an acknowledgement carrying the attribute information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a third possible implementation manner of the third aspect, the first network is a wireless local area network, the second network is a 3GPP network, and the user equipment further includes:

a third sending module, configured to send preset indication information to the network controller, where the preset indication information is used to instruct the network controller to request the attribute information from the user equipment, so that after receiving the preset indication information, the network controller sends, according to the preset indication information, an information request used to request the attribute information;

a request receiving module, configured to receive the information request sent by the network controller; and a step triggering module, configured to: after the request receiving module receives the information request, trigger the user equipment to send the attribute information of the first network to the network controller of the second network.

With reference to the third possible implementation manner of the third aspect, in a fourth possible implementation manner, the third sending module includes:

a third sending unit or a fourth sending unit, where the third sending unit is configured to send a connection establishment request carrying the preset indication information to the network controller, where the connection establishment request is used to request establishment of a wireless control connection between the user equipment and the network controller; or the fourth sending unit is configured to send an acknowledgement carrying the preset indication information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

With reference to the third aspect, the first possible implementation manner, the second possible implementation manner, the third possible implementation manner, or the fourth possible implementation manner of the third aspect, in a fifth possible implementation manner, the identity information includes an IP address and/or a MAC address of an access point of the first network; and the status information includes at least one of a service set identifier, security configuration information, a measurement report, load information, and a supported maximum rate.

According to a fourth aspect, a network controller is provided, where the network controller includes:

a first receiving module, configured to receive attribute information of a first network sent by user equipment, where the attribute information includes identity information of the first network or a combination of identity information and status information of the first network;

a second receiving module, configured to receive quality information of service sent by the user equipment, where the quality information of service includes a correspondence between a quality of service parameter and a service;

a service offloading module, configured to perform service offloading according to the received attribute information and the received quality information of service and a network status of a second network; and an indication feedback module, configured to: after the service offloading module performs offloading, feed back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment.

In a first possible implementation manner of the fourth aspect, the first receiving module is further configured to receive, in a process of establishing a connection to the user equipment, the attribute information of the first network sent by the user equipment.

With reference to the first possible implementation manner of the fourth aspect, in a second possible implementation manner, the first network is a wireless local area network, the second network is a 3GPP network, and the first receiving module includes:

a first receiving unit or a second receiving unit, where the first receiving unit is configured to receive a connection establishment request that carries the attribute information and is sent by the user equipment, where the connection establishment request is used to request establishment of a wireless control connection between the user equipment and the network controller; or the second receiving unit is configured to receive an acknowledgement that carries the attribute information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a third possible implementation manner of the fourth aspect, the first network is a wireless local area network, the second network is a 3GPP network, and the network device further includes:

a third receiving module, configured to receive preset indication information sent by the user equipment, where the preset indication information is used to instruct the network controller to request the attribute information from the user equipment; and a request sending module, configured to send, according to the preset indication information received by the third receiving module, an information request used to request the attribute information, so that the user equipment receives the information request sent by the network controller, and after receiving the information request, sends the attribute information to the network controller.

With reference to the third possible implementation manner of the fourth aspect, in a fourth possible implementation manner, the third receiving module includes:

a third receiving unit or a fourth receiving unit, where the third receiving unit is configured to receive a connection establishment request that carries the preset indication information and is sent by the user equipment, where the connection establishment request is used to request establishment of a wireless control connection between the user equipment and the network controller; or the fourth receiving unit is configured to receive an acknowledgement that carries the preset indication information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

With reference to the fourth aspect, the first possible implementation manner, the second possible implementation manner, the third possible implementation manner, or the fourth possible implementation manner of the fourth aspect, in a fifth possible implementation manner, the service offloading module includes:

a first offloading unit and/or a second offloading unit, where the first offloading unit is configured to offload, according to the received attribute information and the received quality information of service and the network status of the second network, a service corresponding to a quality of service parameter less than a preset threshold onto the first network; and/or the second offloading unit is configured to offload, according to the received attribute information and the received quality information of service and the network status of the second network, a service corresponding to a quality of service parameter greater than a preset threshold onto the second network.

With reference to the fourth aspect, the first possible implementation manner, the second possible implementation manner, the third possible implementation manner, the fourth possible implementation manner, or the fifth possible implementation manner of the fourth aspect, in a sixth possible implementation manner, the identity information includes an IP address and/or a MAC address of an access point of the first network; and the status information includes at least one of a service set identifier, security configuration information, a measurement report, load information, and a supported maximum rate.

With reference to the sixth possible implementation manner of the fourth aspect, in a seventh possible implementation manner, the network controller further includes:

an information sending module, configured to: when the attribute information received by the first receiving module includes the identity information, send request information to the access point of the first network according to the received identity information, so that after receiving the request information, the access point of the first network sends feedback information, where the feedback information includes at least one of a service set identifier, security configuration information, a measurement report, load information, and a support maximum rate; and a fourth receiving module, configured to receive the feedback information sent by the access point of the first network, where correspondingly, the service offloading module is further configured to perform service offloading according to the received identity information and the received quality information of service that are sent by the user equipment, the received feedback information sent by the access point of the first network, and the network status of the second network.

According to a fifth aspect, user equipment is provided, where the user equipment accesses a first network, and the user equipment includes:

a transmitter, configured to send attribute information of the first network to a network controller of a second network, where the attribute information includes identity information of the first network or a combination of identity information and status information of the first network, where the transmitter is further configured to send quality information of service to the network controller of the second network, where the quality information of service includes a correspondence between a quality of service parameter and a service, so that the network controller performs service offloading according to the received attribute information and the received quality information of service and a network status of the second network, and feeds back a service offloading indication, where the service offloading indication is used to indicate a network bearing a service requested by the user equipment;

a receiver, configured to receive the service offloading indication fed back by the network controller; and a processor, configured to select, according to the service offloading indication received by the receiver, a bearer network for a service requested by the user equipment.

In a first possible implementation manner of the fifth aspect, the transmitter is further configured to send the attribute information of the first network to the network controller of the second network in a process of establishing a connection to the network controller.

With reference to the first possible implementation manner of the fifth aspect, in a second possible implementation manner, the first network is a wireless local area network, the second network is a 3rd generation partnership project 3GPP network, and the transmitter is further configured to send a connection establishment request carrying the attribute information to the network controller, where the connection establishment request is used to request establishment of a wireless control connection between the user equipment and the network controller;

or send an acknowledgement carrying the attribute information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a third possible implementation manner of the fifth aspect, the first network is a wireless local area network, the second network is a 3GPP network, and the transmitter is further configured to send preset indication information to the network controller, where the preset indication information is used to instruct the network controller to request the attribute information from the user equipment, so that after receiving the preset indication information, the network controller sends, according to the preset indication information, an information request used to request the attribute information;

the receiver is further configured to receive the information request sent by the network controller; and the processor is further configured to: after the receiver receives the information request, trigger the user equipment to send the attribute information of the first network to the network controller of the second network.

With reference to the third possible implementation manner of the fifth aspect, in a fourth possible implementation manner, the transmitter is further configured to send a connection establishment request carrying the preset indication information to the network controller, where the connection establishment request is used to request establishment of a wireless control connection between the user equipment and the network controller;

or send an acknowledgement carrying the preset indication information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

With reference to the fifth aspect, the first possible implementation manner, the second possible implementation manner, the third possible implementation manner, or the fourth possible implementation manner of the fifth aspect, in a fifth possible implementation manner, the identity information includes an IP address and/or a MAC address of an access point of the first network; and the status information includes at least one of a service set identifier, security configuration information, a measurement report, load information, and a supported maximum rate.

According to a sixth aspect, a network controller is provided, where the network controller includes:

a receiver, configured to receive attribute information of a first network sent by user equipment, where the attribute information includes identity information of the first network or a combination of identity information and status information of the first network, where the receiver is further configured to receive quality information of service sent by the user equipment, where the quality information of service includes a correspondence between a quality of service parameter and a service;

a processor, configured to perform service offloading according to the received attribute information and the received quality information of service and a network status of the second network; and a transmitter, configured to: after the processor performs service offloading, feed back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment.

In a first possible implementation manner of the sixth aspect, the receiver is further configured to receive, in a process of establishing a connection to the user equipment, the attribute information of the first network sent by the user equipment.

With reference to the first possible implementation manner of the sixth aspect, in a second possible implementation manner, the first network is a wireless local area network, the second network is a 3GPP network, and the receiver is further configured to receive a connection establishment request that carries the attribute information and is sent by the user equipment, where the connection establishment request is used to request establishment of a wireless control connection between the user equipment and the network controller; or receive an acknowledgement that carries the attribute information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a third possible implementation manner of the sixth aspect, the first network is a wireless local area network, the second network is a 3GPP network, and the receiver is further configured to receive preset indication information sent by the user equipment, where the preset indication information is used to instruct the network controller to request the attribute information from the user equipment; and the transmitter is further configured to send, according to the preset indication information received by the receiver, an information request used to request the attribute information, so that the user equipment receives the information request sent by the network controller, and after receiving the information request, sends the attribute information to the network controller.

With reference to the third possible implementation manner of the sixth aspect, in a fourth possible implementation manner, the receiver is further configured to receive a connection establishment request that carries the preset indication information and is sent by the user equipment, where the connection establishment request is used to request establishment of a wireless control connection between the user equipment and the network controller; or receive an acknowledgement that carries the preset indication information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

With reference to the sixth aspect, the first possible implementation manner, the second possible implementation manner, the third possible implementation manner, or the fourth possible implementation manner of the sixth aspect, in a fifth possible implementation manner, the processor is further configured to offload, according to the received attribute information and the received quality information of service and the network status of the second network, a service corresponding to a quality of service parameter less than a preset threshold onto the first network; and/or offload, according to the received attribute information and the received quality information of service and the network status of the second network, a service corresponding to a quality of service parameter greater than a preset threshold onto the second network.

With reference to the sixth aspect, the first possible implementation manner, the second possible implementation manner, the third possible implementation manner, the fourth possible implementation manner, or the fifth possible implementation manner of the sixth aspect, in a sixth possible implementation manner, the identity information includes an IP address and/or a MAC address of an access point of the first network; and the status information includes at least one of a service set identifier, security configuration information, a measurement report, load information, and a supported maximum rate.

With reference to the sixth possible implementation manner of the sixth aspect, in a seventh possible implementation manner, the transmitter is further configured to: when the attribute information received by the receiver includes the identity information, send request information to the access point of the first network according to the received identity information, so that after receiving the request information, the access point of the first network sends feedback information, where the feedback information includes at least one of a service set identifier, security configuration information, a measurement report, load information, and a support maximum rate;

the receiver is further configured to receive the feedback information sent by the access point of the first network; and correspondingly, the processor is further configured to perform service offloading according to the received identity information and the received quality information of service that are sent by the user equipment, the received feedback information sent by the access point of the first network, and the network status of the second network.

According to a seventh aspect, a service offloading system is provided, where the service offloading system includes the user equipment described in the third aspect and the network controller described in the fourth aspect.

According to an eighth aspect, a service offloading system is provided, where the service offloading system includes the user equipment described in the fifth aspect and the network controller described in the sixth aspect.

Beneficial effects of the technical solutions provided in the embodiments of the present invention are as follows:

Attribute information of a first network and quality information of service are sent to a network controller of a second network; the network controller performs service offloading according to the received information, and feeds back a service offloading indication, where the service offloading indication is used to indicate a network bearing a service requested by user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, a network status of the second network, and the quality information of service, so as to improve network utilization.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
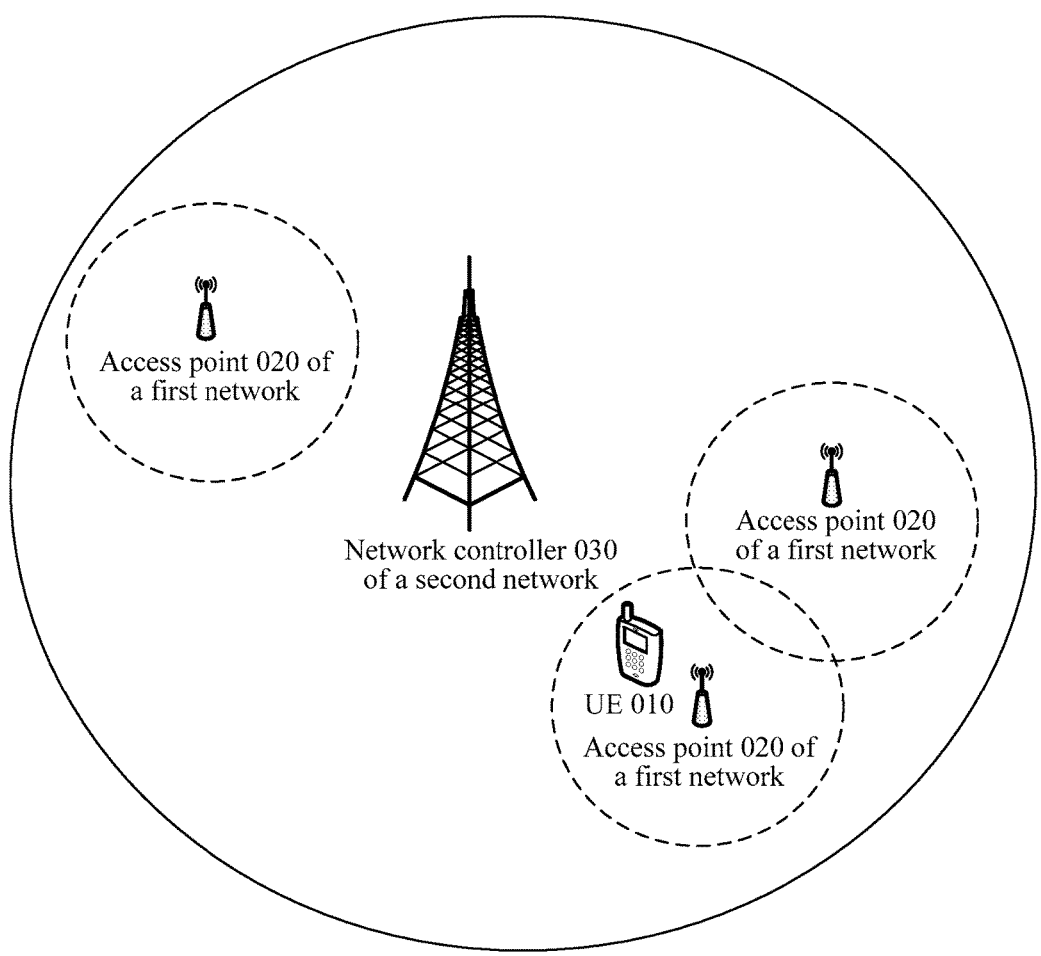
FIG. 1 shows an implementation environment involved in embodiments of the present invention.

Referring to FIG. 1, which shows an implementation environment involved in embodiments of the present invention, the implementation environment may include UE (user equipment) 010, an access point 020 of a first network, and a network controller 030 of a second network.

The UE 010 may be user equipment such as a mobile phone, a tablet computer, an e-book reader, or a laptop computer. The UE 010 may be connected to the access point 020 of the first network by means of a wireless network, acquire attribute information of the first network, and enable the first network to bear some services initiated by the UE; the UE may also be connected to the network controller 030 of the second network by means of a wired or wireless network, so as to send the attribute information acquired from the access point of the first network, and quality information of a service to the network controller 030 by means of the wired or wireless network, so that the network controller 030 can perform service offloading according to the received attribute information and the received quality information of a service, and a network status of the second network, and enables the second network to bear some service initiated by the UE.

The access point 020 of the first network is deployed within coverage of the first network, and the access point 020 of the first network may be connected to the UE 010 by means of a wireless network, so as to feed back the attribute information of the first network device to the UE 010 by means of the wireless network, and bear some service initiated by the UE 010; the access point 020 of the first network may also be connected to the network controller 030 of the second network by means of a wired or wireless network, so as to feed back status information of the first network to the network controller 030 of the second network by means of the wired or wireless network.

The network controller 030 of the second network may be connected to the access point 020 of the first network by means of a wired or wireless network, so as to acquire the status information of the first network from the access point of the first network; the network controller 030 of the second network may also be connected to the UE 010 by means of a wireless network, so as to receive, by means of the wireless network, the attribute information of the first network and the quality information of a service that are sent by the UE 010, and perform service offloading according to the received information.

Embodiment 1

Figure 2:
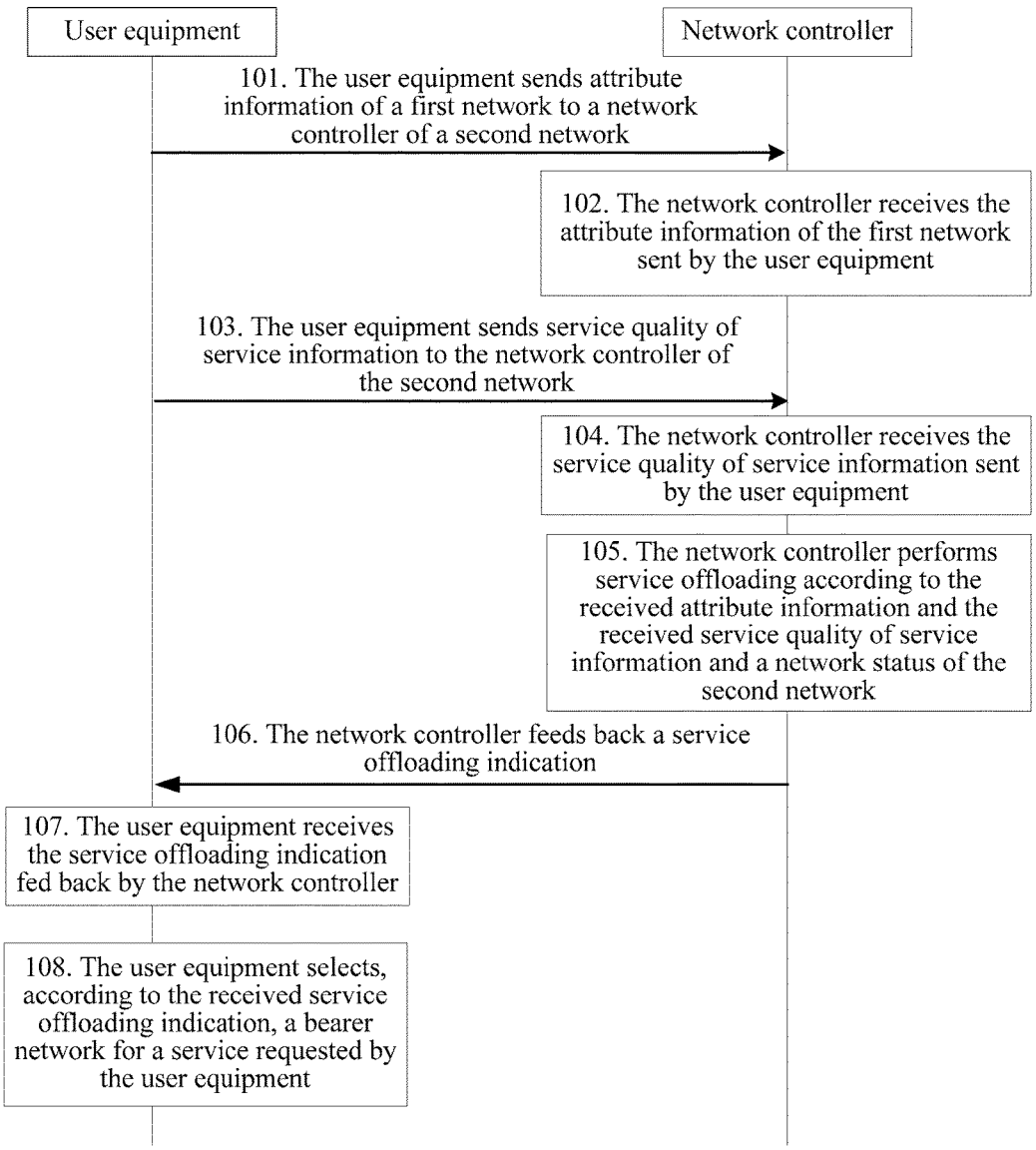
FIG. 2 is a method flowchart of a service offloading method according to Embodiment 1 of the present invention.

Referring to FIG. 2, which is a method flowchart of a service offloading method according to Embodiment 1 of the present invention, the service offloading method may include:

Step 101: User equipment sends attribute information of a first network to a network controller of a second network.

The attribute information includes identity information of the first network or a combination of identity information and status information of the first network.

Step 102: The network controller receives the attribute information of the first network sent by the user equipment.

Step 103: The user equipment sends quality information of service to the network controller of the second network.

The quality information of service includes a correspondence between a quality of service parameter and a service.

Step 104: The network controller receives the quality information of service sent by the user equipment.

Step 105: The network controller performs service offloading according to the received attribute information and the received quality information of service and a network status of the second network.

Step 106: The network controller feeds back a service offloading indication.

The service offloading indication is used to indicate a network bearing a service requested by the user equipment.

Step 107: The user equipment receives the service offloading indication fed back by the network controller.

Step 108: The user equipment selects, according to the received service offloading indication, a bearer network for a service requested by the user equipment.

In conclusion, in the service offloading method provided in this embodiment, attribute information of a first network and quality information of service are sent to a network controller of a second network; the network controller performs service offloading according to the received information, and feeds back a service offloading indication, where the service offloading indication is used to indicate a network bearing a service requested by user equipment, so that the user equipment receives the service offloading indication fed back by the network controller, and selects, according to the received service offloading indication, a bearer network for a service requested by the user equipment, thereby solving a problem that because an existing service offloading method cannot well adapt to changes of a wireless environment, network utilization is low, and achieving an effect that the network controller of the second network can perform service offloading appropriately according to a network status of the first network, a network status of the second network, and the quality information of service, so as to improve network utilization.

Embodiment 2

Figure 3A:
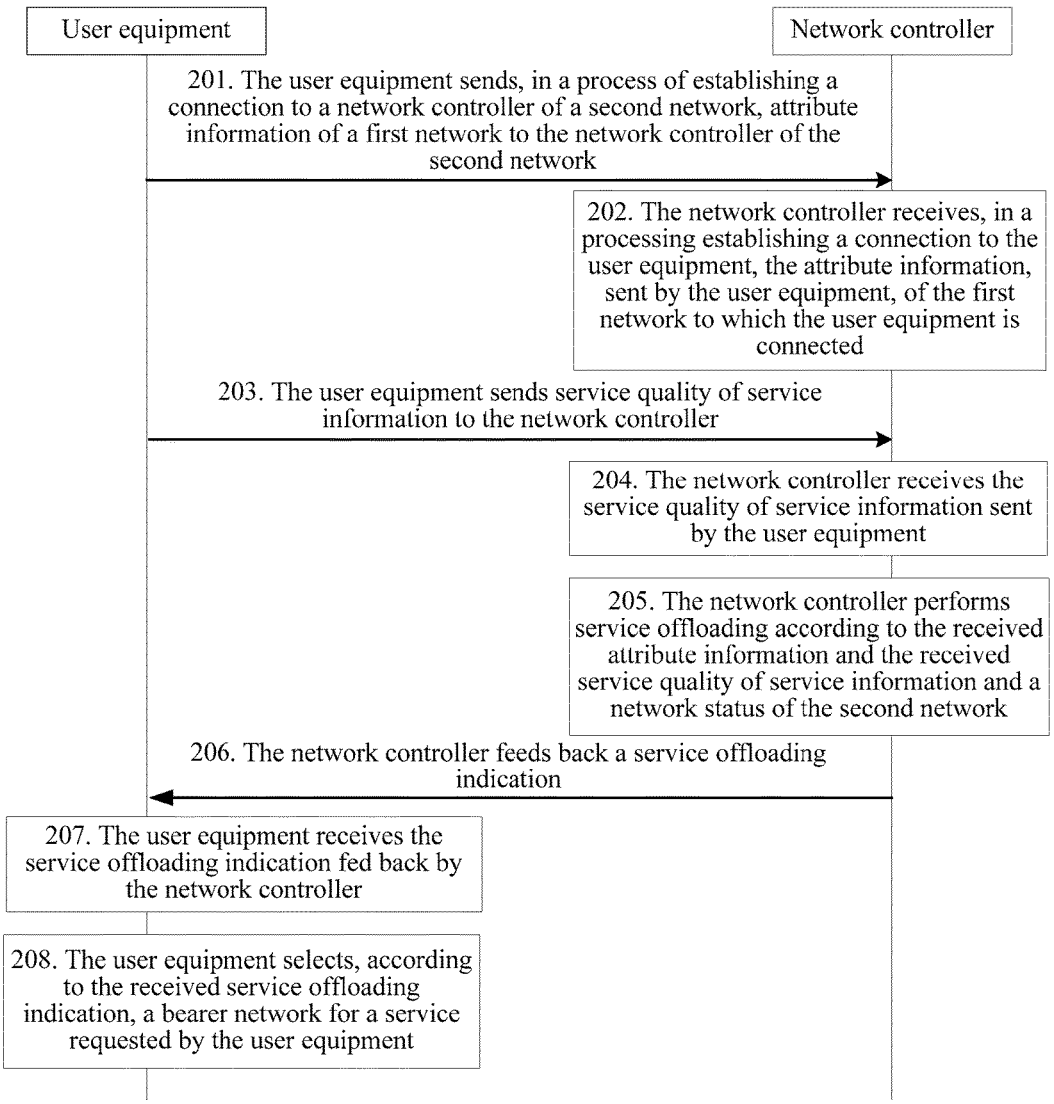
FIG. 3A is a method flowchart of a service offloading method according to Embodiment 2 of the present invention.

Referring to FIG. 3A, which is a method flowchart of a service offloading method according to Embodiment 2 of the present invention, the service offloading method may be applied to the implementation environment shown in FIG. 1. The service offloading method may include:

Step 201: User equipment sends, in a process of establishing a connection to a network controller of a second network, attribute information of a first network to the network controller of the second network.

This embodiment uses an example in which the first network is a WLAN and the second network is a 3GPP network. In addition, in this embodiment, the UE refers to a UE that is connected to the WLAN and has already acquired attribute information of the WLAN.

In the 3GPP network, when the UE needs to communicate with another UE by using the 3GPP network, the UE first needs to establish a connection to a network controller of the 3GPP network, and the UE may send the acquired attribute information of the WLAN to the network controller of the 3GPP network in a process of establishing a connection to the network controller, where the attribute information may include identity information of the WLAN or a combination of identity information and status information of the WLAN, where the identity information may include either or two of an IP address and a MAC address of an access point of the WLAN, and the status information may include at least one of a service set identifier, security configuration information, a measurement report, load information, and a supported maximum rate.

Specifically, a process in which the UE establishes a connection to the network controller may include: first, the UE sends a connection establishment request to the network controller; second, the network controller establishes a wireless control connection between the UE and the network controller according to the connection establishment request, and sends configuration information related to connection establishment to the UE; and third, the UE sends an acknowledgement to the network controller, where the acknowledgement includes at least quality information of service, and the quality information of service may include a correspondence between a quality of service parameter and a service. Therefore, the step of sending, by the UE, attribute information to the network controller may include either of the following two manners:

First, send a connection establishment request carrying the attribute information to the network controller.

Figure 3B:
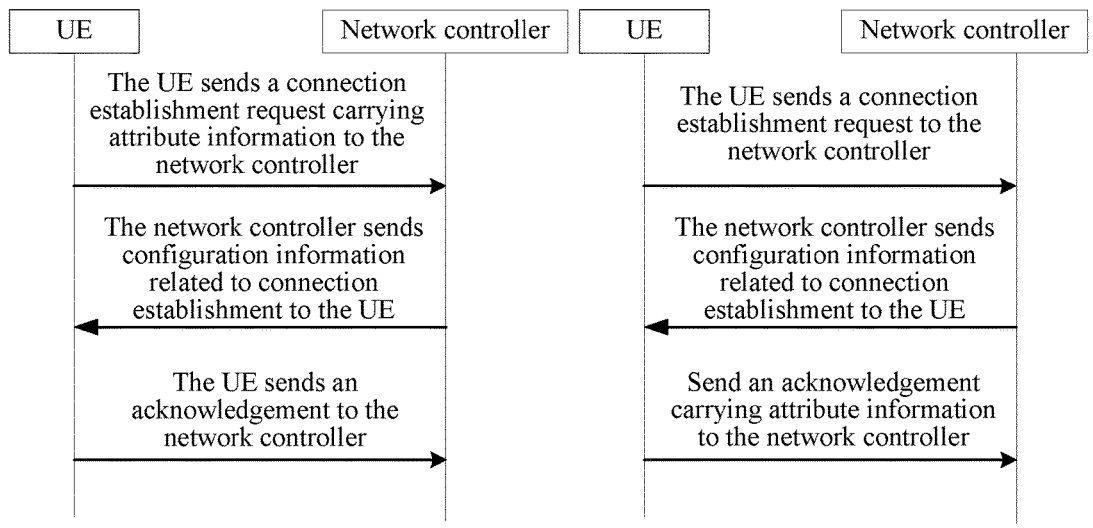
FIG. 3B is a schematic diagram when user equipment establishes a connection to a network controller according to Embodiment 2 of the present invention.

In a first possible implementation manner, the UE may send the connection establishment request carrying the attribute information to the network controller in a process of establishing a connection to the network controller, and for details, refer to FIG. a of FIG. 3B, where the connection establishment request is used to request establishment of a wireless control connection between the user equipment and the network controller.

Second, send an acknowledgement carrying the attribute information to the network controller.

In a second possible implementation manner, the UE may send the acknowledgement carrying the attribute information to the network controller in a process of establishing a connection to the network controller, and for details, refer to FIG. b of FIG. 3B, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

Preferably, the UE may send the attribute information of the WLAN to the network controller when establishing a connection to the network controller for the first time.

Specifically, after the UE completes communication with another UE, in order to not occupy network resources and to save power, the UE may release the connection to the network controller, and when initiating a communication request again, the UE requests establishment of a connection to the network controller again. Meanwhile, the UE may send the attribute information of the WLAN to the network controller when establishing a connection to the network controller for the first time, and then, the network controller may directly perform a corresponding operation according to the received attribute information; therefore, in order to save signaling overheads and reduce communication complexity, the UE may send the attribute information only when the network controller does not know the attribute information, that is, when establishing a connection to the network controller for the first time.

Figure 3C:
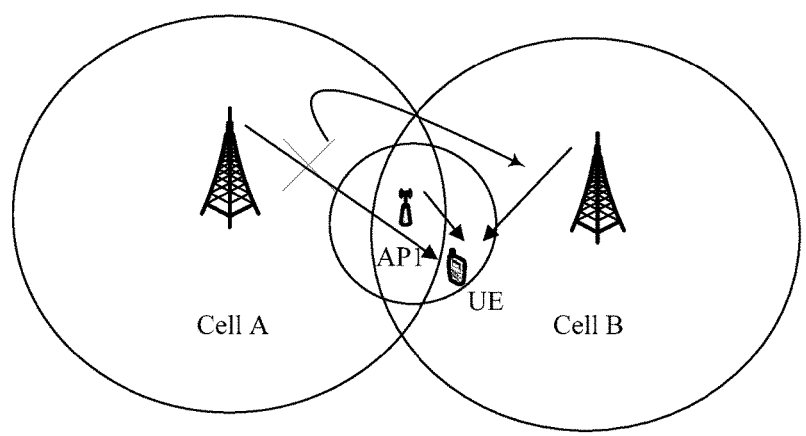
FIG. 3C is a schematic diagram of network environment when user equipment performs cell reselection according to Embodiment 2 of the present invention.

For example, in a network environment shown in FIG. 3C, the UE is located within an area covered by both a cell A and a cell B, where the area is deployed with a WLAN. The UE camps on the cell A and is connected to the WLAN. However, as the UE moves, quality of service of the cell A deteriorates and quality of service of the cell B is improved increasingly; therefore, to ensure communication quality, the UE may perform cell reselection and choose to camp on the cell B. Because the UE establishes a connection to a network controller corresponding to the cell B for the first time and the network controller corresponding to the cell B does not know attribute information of the WLAN to which the UE is connected, in this case, the UE may send the attribute information to the network controller in a process of establishing a connection to the network controller.

However, if the UE does not perform cell reselection during movement, but camp on the cell A, when the UE releases the connection to the network controller corresponding to the cell A and requests connection establishment again, the UE knows that the network controller of the cell A already knows the attribute information; in this case, the UE may not send the attribute information, and no further details are described in this embodiment again.

It should be additionally noted that, this embodiment uses only an example in which attribute information is sent to the network controller in a process of establishing a connection to the network controller. During actual implementation, the attribute information may also be sent to the network controller independently after the connection is established. This embodiment does not limit a specific sending manner.

It should also be additionally noted that, in this embodiment, a reason why the UE does not establish a connection to the network controller may be: the UE releases a connection to the network controller because the UE offloads all services initiated by the UE onto the WLAN by using an existing service offloading method; or a user enables, by means of manual selection, the WLAN to bear all service initiated by the UE, which is not limited in this embodiment.

It should also be additionally noted that, after the UE is connected to the WLAN, the UE may acquire the attribute information of the WLAN in real time, or may acquire the attribute information in a manner of acquisition at a preset moment, which is not limited in this embodiment.

Step 202: The network controller receives, in a processing of establishing a connection to the user equipment, the attribute information, sent by the user equipment, of the first network to which the user equipment is connected.

Correspondingly, the network controller may receive the attribute information, sent by the UE, of the WLAN to which the UE is connected.

Step 203: The user equipment sends quality information of service to the network controller.

For different services, requirements on quality of service of a network may be the same or may be different; therefore, the UE may also send the quality information of service to the network controller, where the quality information of service may include a correspondence between a quality of service parameter and a service.

Specifically, in a process of establishing a connection to the network controller, and when the UE sends the acknowledgement to the network controller after the connection establishment succeeds, the UE may send an acknowledgement that carries a quality of service parameter and a corresponding service bearer ID to the network controller, where the service bearer ID is used to represent one or more services corresponding to the quality of service parameter, which is similar to the existing technical solutions, and no further details are described in this embodiment.

It should be noted that, this embodiment uses only an example in which the quality information of service is sent to the network controller by using an existing sending method. During actual implementation, all other possible sending methods may also be used, which is not limited in this embodiment.

Step 204: The network controller receives the quality information of service sent by the user equipment.

Correspondingly, the network controller may receive the quality information of service sent by the UE.

Step 205: The network controller performs service offloading according to the received attribute information and the received quality information of service and a network status of the second network.

Specifically, the step of performing, by the network controller, service offloading may include at least one of the following manners:

First, the network controller offloads, according to the received attribute information and the received quality information of service and the network status of the second network, a service corresponding to a quality of service parameter less than a preset threshold onto the first network.

Because the WLAN cannot well ensure QoS of a service, when performing service offloading, the network controller may offload a service corresponding to a quality of service parameter less than the preset threshold onto the WLAN, and offload a service corresponding to a quality of service parameter greater than the preset threshold onto the 3GPP network.

Specifically, if the attribute information received by the network controller includes only the identity information, the network controller may detect, according to a network status of the 3GPP network, whether the 3GPP network allows load access; and if a detection result is that the 3GPP network allows load access, the network controller may offload, according to the correspondence, only a service corresponding to a quality of service parameter less than the preset threshold onto the WLAN, and offload services corresponding to the other quality of service parameters onto the 3GPP network; or if a detection result is that the 3GPP network does not allow load access, the network controller offloads all services onto the WLAN.

If the received attribute information further includes the status information, the network controller may perform service offloading according to parameters in the attribute information, a correspondence between a quality of service parameter and a service, and the network status of the 3GPP network, for example, if the status information includes security configuration information, a measurement report, and load information, the network controller may set a weighting value for each of the security configuration information, the measurement report, and the load information, calculate a total score of the WLAN according to the parameter values of the parameters, and establish a correspondence between the quality of service parameter and the total score, so as to determine to offload, when the quality of service parameter is less than a preset threshold and the total score of the WLAN is greater than another preset threshold, a service corresponding to a quality of service parameter less than a preset threshold onto the WLAN, and offload services corresponding to the other quality of service parameters onto the 3GPP network; or if the status information includes a supported maximum rate, the network controller may select, from a service corresponding to a quality of service parameter less than a preset threshold, a service requiring a maximum rate less than a maximum rate supported by an access point of the WLAN and offload the service onto the WLAN, and offload the other services onto the 3GPP network. Certainly, during actual implementation, service offloading may also be performed by using another offloading method according to the attribute information, the correspondence between a quality of service parameter and a service, and the network status of the 3GPP network. This embodiment is described only by using the foregoing offloading method as an example, and does not limit a specific implementation manner.

In this embodiment, after the offloading, the network controller determines to offload web page browsing and data downloading services onto the WLAN, and offload voice call and short message services onto the 3GPP network.

Second, the network controller offloads, according to the received attribute information and the received quality information of service and the network status of the second network, a service corresponding to a quality of service parameter greater than a preset threshold onto the second network.

The network controller may also offload, according to the received attribute information and the network status of the 3GPP network, the service corresponding to the quality of service parameter greater than the preset threshold onto the 3GPP network, where a specific implementation manner is similar to the foregoing step, and no further details are described in this embodiment again.

Step 206: The network controller feeds back a service offloading indication.

After performing service offloading, the network controller may feed back the service offloading indication, where the service offloading indication is used to indicate a network bearing a service requested by the user equipment.

For example, after performing service offloading, the network controller offloads the web page browsing and data downloading services onto the WLAN, and offloads the voice call and short message services onto the 3G network, and then the network controller may feed back the service offloading indication whose content is 'Offload the web page browsing and data downloading services onto the WLAN and offload the voice call and short message services onto the 3G network'.

It should be noted that, during actual implementation, the service offloading indication may be used to indicate a correspondence between multiple services and bearer networks, as long as it includes a bearer network corresponding to a service requested by the UE. Specific content of the service offloading indication is not limited in this embodiment.

Step 207: The user equipment receives the service offloading indication fed back by the network controller.

Correspondingly, the UE may receive the service offloading indication fed back by the network controller.

Step 208: The user equipment selects, according to the received service offloading indication, a bearer network for a service requested by the user equipment.

After receiving the service offloading indication fed back by the network controller, the UE may select, according to the received service offloading indication, a bearer network for the service requested by the UE.

For example, if the service offloading indication received by the UE specifies that the web page browsing service and the data downloading service are borne by the WLAN and the voice call and short message services are borne by the 3G network, when the service initiated by the UE is web page browsing, the UE may enable the WLAN to bear the initiated service; when the service initiated by the UE is voice call, the UE may enable the 3G network to bear the initiated service, and no further details are described in this embodiment again.

Figure 3D:
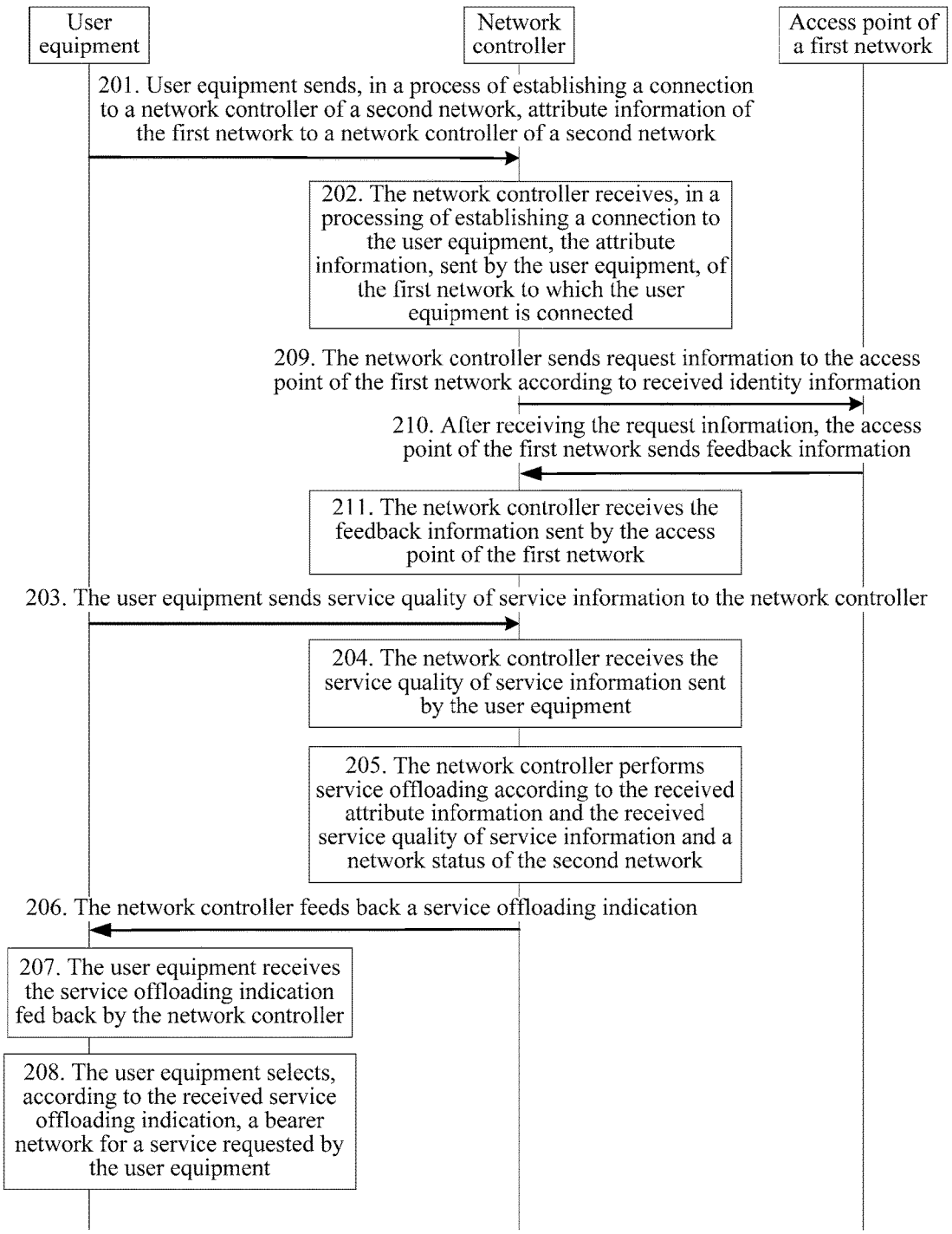
FIG. 3D is another method flowchart of the service offloading method according to Embodiment 2 of the present invention.

It should be additionally noted that, if the attribute information sent by the UE and received by the network controller includes only the identity information, to better implement service offloading, before step 205, the network controller may request, from the access point of the WLAN according to the received identity information, feedback information indicating a network status of the WLAN, and for details, refer to FIG. 3D, where the feedback information includes at least one of a service set identifier, security configuration information, a measurement report, load information, and a supported maximum rate.

The step of requesting, by the network controller, feedback information from the access point of the WLAN may include:

Step 209: The network controller sends request information to the access point of the first network according to received identity information.

Specifically, after receiving the identity information, the network controller may determine, according to the identity information, an access point of the WLAN to which the UE is connected, and in this case, the network controller may send the request information to the access point of the WLAN according to the received identity information.

Step 210: After receiving the request information, the access point of the first network sends feedback information.

After receiving the request information, the access point of the WLAN may send the feedback information.

Step 211: The network controller receives the feedback information sent by the access point of the first network.

Correspondingly, the network controller may receive the feedback information sent by the access point of the WLAN.

After step 209 to step 211, step 205 may be represented as: performing service offloading according to the received identity information and the received quality information of service that are sent by the user equipment, the received feedback information sent by the access point of the first network, and the network status of the second network.

Specifically, because content of the feedback information sent by the access point of the WLAN is the same as content of the status information, a method used by the network controller to perform service offloading is similar to a method used by the network controller when the network controller directly receives attribute information that is sent by the user equipment and includes the identity information and the status information, and no further details are described in this embodiment again.

In conclusion, in the service offloading method provided in this embodiment, attribute information of a first network and quality information of service are sent to a network controller of a second network; the network controller performs service offloading according to the received information, and feeds back a service offloading indication, where the service offloading indication is used to indicate a network bearing a service requested by user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, a network status of the second network, and the quality information of service, so as to improve network utilization.

Embodiment 3

Figure 4A:
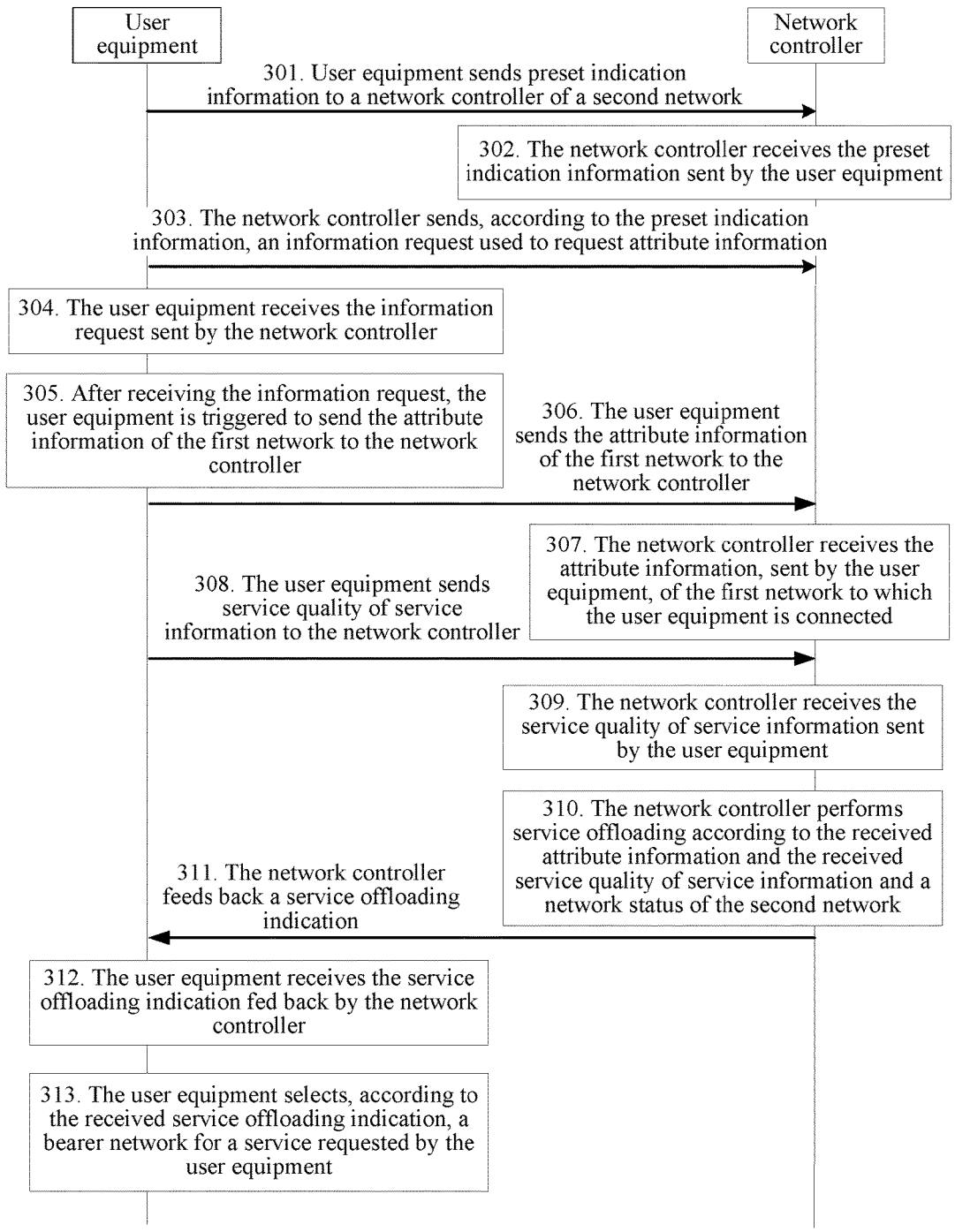
FIG. 4A is a method flowchart of a service offloading method according to Embodiment 3 of the present invention.

Referring to FIG. 4A, which is a method flowchart of a service offloading method according to Embodiment 3 of the present invention, the service offloading method may be applied to the implementation environment shown in FIG. 1. A difference between this embodiment and Embodiment 2 lies in that, in Embodiment 2, attribute information of a wireless local area network is directly sent to a network controller, while in this embodiment, preset indication information is sent to a network controller, and after receiving the preset indication information, the network controller acquires attribute information in a manner of sending an information request. The service offloading method may include:

Step 301: User equipment sends preset indication information to a network controller of a second network.

This embodiment still uses an example in which a first network is a WLAN and the second network is a 3GPP network. In addition, in this embodiment, the UE refers to UE that is connected to the WLAN and has already acquired attribute information of the WLAN. The UE may send the preset indication information to the network controller, where the preset indication information is used to instruct the network controller to request attribute information from the UE, the attribute information may include identity information of the first network or a combination of identity information and status information of the first network, the identity information may include at least one of an IP address and a MAC address of the WLAN, and the status information may include at least one of a service set identifier, security configuration information, a measurement report, load information, and a supported maximum rate.

Specifically, when the UE needs to communicate with another UE by using a 3GPP network, the UE first needs to establish a connection to a network controller of the 3GPP network. A process in which the UE establishes a connection to the network controller of the 3GPP network may include: first, the UE sends a connection establishment request to the network controller; second, the network controller establishes a wireless control connection between the UE and the network controller according to the connection establishment request, and sends configuration information related to connection establishment to the UE; third, the UE sends an acknowledgement to the network controller, where the acknowledgement includes at least quality information of service, and the quality information of service includes a correspondence between a quality of service parameter and a service. Therefore, the step of sending, by UE, preset indication information to a network controller may include either of the following two manners:

First, the UE sends a connection establishment request carrying the preset indication information to the network controller.

In a first possible implementation manner, the UE may send the connection establishment request carrying the preset indication information to the network controller in a process of establishing a connection to the network controller, where the connection establishment request is used to request establishment of a wireless control connection between the user equipment and the network controller.

Second, the UE sends an acknowledgement carrying the preset indication information to the network controller.

In a second possible implementation manner, the UE may send an acknowledgement carrying the preset indication information to the network controller in a process of establishing a connection to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

Preferably, the UE may send the preset indication information to the network controller when establishing a connection to the network controller for the first time.

Specifically, after the UE completes communication with another UE, in order to not occupy network resources and to save power, the UE may release the connection to the network controller, and when initiating a communication request again, the UE requests establishment of a connection to the network controller again. Meanwhile, the UE may send the preset indication information to the network controller when establishing a connection to the network controller for the first time, and then, the network controller may directly perform a corresponding operation according to the received preset indication information; therefore, in order to save signaling overheads and reduce communication complexity, the UE may send the preset indication information only when the network controller does not know the attribute information, that is, when establishing a connection to the network controller for the first time, where the preset indication information is used to instruct the network controller to request attribute information from the UE.

It should be additionally noted that, this embodiment uses only an example in which preset indication information is sent in a process of establishing a connection to the network controller. During actual implementation, the preset indication information may also be sent to the network controller independently after the connection is established. This embodiment does not limit a specific sending manner.

It should also be additionally noted that, in this embodiment, a reason why the UE does not establish a connection to the network controller may be: the UE releases a connection to the network controller because the UE offloads all services initiated by the UE onto the WLAN by using an existing service offloading method; or a user enables, by means of manual selection, the WLAN to bear all service initiated by the UE, which is not limited in this embodiment.

It should also be additionally noted that, after the UE is connected to the WLAN, the UE may acquire the attribute information of the WLAN in real time, or may acquire the attribute information in a manner of acquisition at a preset moment, which is not limited in this embodiment.

It should also be additionally noted that, the preset indication information may be an identifier, and is mainly used to instruct the network controller to request the attribute information from the UE. During specific implementation, the specific content of the preset indication information is not limited as long as the foregoing function can be implemented.

Step 302: The network controller receives the preset indication information sent by the user equipment.

Step 303: The network controller sends, according to the preset indication information, an information request used to request attribute information.

After receiving the preset indication information sent by the UE, the network controller may send, according to the preset indication information, the information request used to request the attribute information.

Step 304: The user equipment receives the information request sent by the network controller.

Step 305: After receiving the information request, the user equipment is triggered to send the attribute information of the first network to the network controller.

Step 306: The user equipment sends the attribute information of the first network to the network controller.

After receiving the information request, the UE may send the attribute information of the WLAN to the network controller. Specifically, the UE may send the attribute information to the network controller by means of the previously established wireless control connection.

Step 307: The network controller receives the attribute information, sent by the user equipment, of the first network to which the user equipment is connected.

Step 308: The user equipment sends quality information of service to the network controller.

Step 309: The network controller receives the quality information of service sent by the user equipment.

Step 310: The network controller performs service offloading according to the received attribute information and the received quality information of service and a network status of the second network.

Specifically, the step of performing, by the network controller, service offloading may include at least one of the following manners:

First, the network controller offloads, according to the received attribute information and the received quality information of service and the network status of the second network, a service corresponding to a quality of service parameter less than a preset threshold onto the wireless local area network.

Second, the network controller offloads, according to the received attribute information and the received quality information of service and the network status of the second network, a service corresponding to a quality of service parameter greater than a preset threshold onto the second network.

It should be noted that, this step is similar to step 205 in Embodiment 2, and for technical details, refer to step 205, and no further details are described in this embodiment again.

Step 311: The network controller feeds back a service offloading indication.

The service offloading indication is used to indicate a network bearing a service requested by the user equipment.

Step 312: The user equipment receives the service offloading indication fed back by the network controller.

Step 313: The user equipment selects, according to the received service offloading indication, a bearer network for a service requested by the user equipment.

It should be noted that, step 311 to step 313 in this embodiment are similar to step 206 to step 209 in Embodiment 2. For technical details, refer to Embodiment 2, and no further details are described in this embodiment again.

Figure 4B:
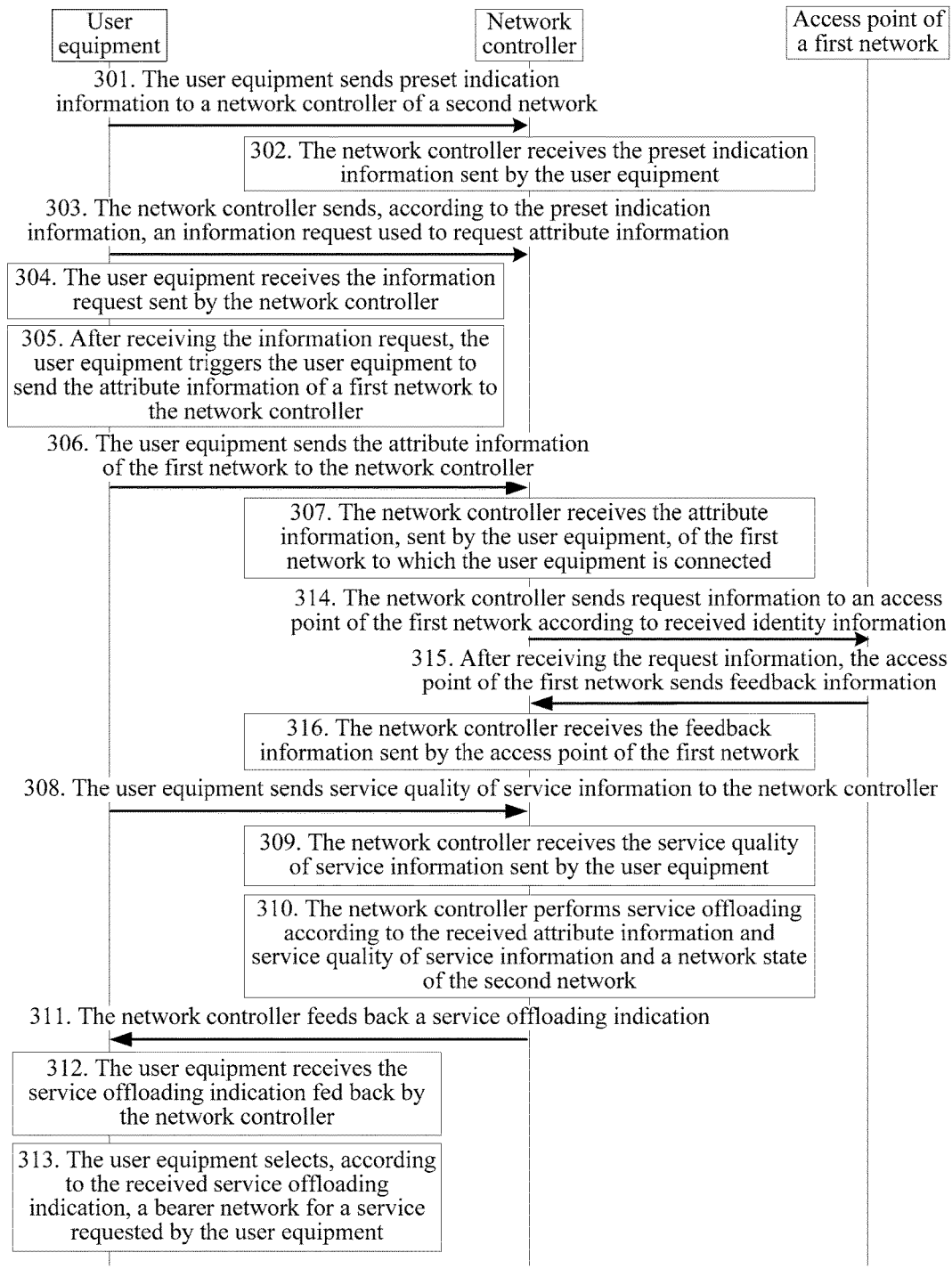
FIG. 4B is another method flowchart of the service offloading method according to Embodiment 3 of the present invention.

It should also be additionally noted that, if the feature information sent by the UE and received by the network controller includes only the identity information, to better implement service offloading, before step 310, the network controller may request feedback information from an access point of the WLAN according to the received identity information, and for details, refer to FIG. 4B, where the feedback information includes at least one of a service set identifier, security configuration information, a measurement report, load information, and a supported maximum rate.

The step of requesting, by the network controller, feedback information from an access point of the WLAN may include:

Step 314: The network controller sends request information to an access point of the first network according to the received identity information.

Specifically, after receiving the identity information, the network controller may determine, according to the identity information, an access point of the WLAN to which the UE is connected, and in this case, the network controller may send the request information to the access point of the WLAN according to the received identity information.

Step 315: After receiving the request information, the access point of the first network sends feedback information.

After receiving the request information, the access point of the WLAN may send the feedback information.

Step 316: The network controller receives the feedback information sent by the access point of the first network.

After step 314 to step 316, step 310 may be represented as: performing service offloading according to the received identity information and the received quality information of service that are sent by the user equipment, the received feedback information sent by the access point of the first network, and the network status of the second network.

Specifically, because content of the feedback information sent by the access point of the WLAN is the same as content of the status information, a method used by the network controller to perform service offloading is similar to a method used by the network controller when the network controller directly receives attribute information that is sent by the user equipment and includes the identity information and the status information, and no further details are described in this embodiment again.

In conclusion, in the service offloading method provided in this embodiment, attribute information of a first network and quality information of service are sent to a network controller of a second network; the network controller performs service offloading according to the received information, and feeds back a service offloading indication, where the service offloading indication is used to indicate a network bearing a service requested by user equipment, so that the user equipment receives the service offloading indication fed back by the network controller, selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, a network status of the second network, and the quality information of service, so as to improve network utilization.

Embodiment 4

Figure 5:
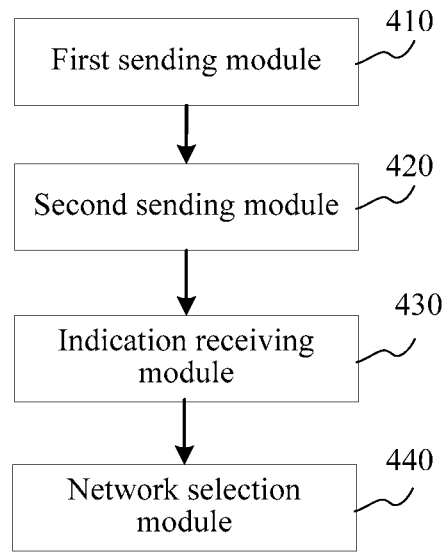
FIG. 5 is a structural block diagram of user equipment according to Embodiment 4 of the present invention.

Referring to FIG. 5, which is a structural block diagram of user equipment according to Embodiment 5 of the present invention, the user equipment accesses a first network. The user equipment may include a first sending module 410, a second sending module 420, an indication receiving module 430, and a network selection module 440.

The first sending module 410 is configured to send attribute information of the first network to a network controller of a second network, where the attribute information includes identity information of the first network or a combination of identity information and status information of the first network.

The second sending module 420 is configured to send quality information of service to the network controller of the second network, where the quality information of service includes a correspondence between a quality of service parameter and a service, so that the network controller performs service offloading according to the received attribute information and the received quality information of service and a network status of the second network, and feeds back a service offloading indication, where the service offloading indication is used to indicate a network bearing a service requested by the user equipment.

The indication receiving module 430 is configured to receive the service offloading indication fed back by the network controller.

The network selection module 440 is configured to select, according to the service offloading indication received by the indication receiving module 430, a bearer network for a service requested by the user equipment.

In conclusion, the user equipment provided in this embodiment sends attribute information of a first network and quality information of service to a network controller of a second network; the network controller performs service offloading according to the received information, and feeds back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, a network status of the second network, and the quality information of service, so as to improve network utilization.

Embodiment 5

Figure 6:
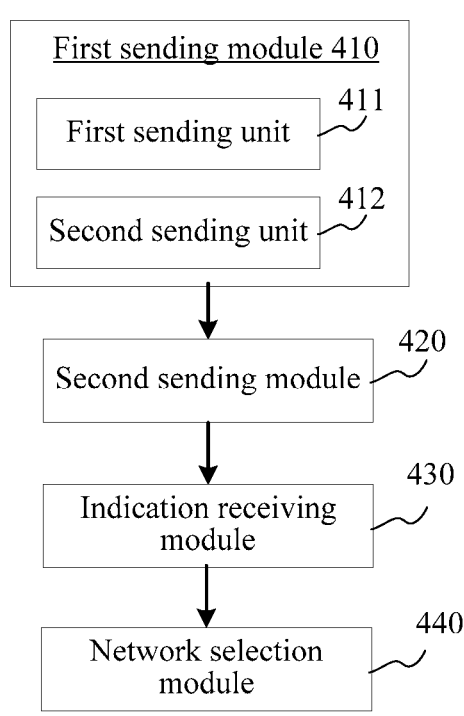
FIG. 6 is a structural block diagram of user equipment according to Embodiment 5 of the present invention.

Referring to FIG. 6, which is a structural block diagram of user equipment according to Embodiment 5 of the present invention, the user equipment accesses a first network. The user equipment may include a first sending module 410, a second sending module 420, an indication receiving module 430, and a network selection module 440.

The first sending module 410 is configured to send attribute information of the first network to a network controller of a second network, where the attribute information includes identity information of the first network or a combination of identity information and status information of the first network.

The second sending module 420 is configured to send quality information of service to the network controller of the second network, where the quality information of service includes a correspondence between a quality of service parameter and a service, so that the network controller performs service offloading according to the received attribute information and the received quality information of service and a network status of the second network, and feeds back a service offloading indication, where the service offloading indication is used to indicate a network bearing a service requested by the user equipment.

The indication receiving module 430 is configured to receive the service offloading indication fed back by the network controller.

The network selection module 440 is configured to select, according to the service offloading indication received by the indication receiving module 430, a bearer network for a service requested by the user equipment.

In a first possible implementation manner of this embodiment, the first sending module 410 is further configured to send the attribute information of the first network to the network controller of the second network in a process of establishing a connection to the network controller.

In a second possible implementation manner of this embodiment, the first network is a wireless local area network, the second network is a 3GPP network, and the first sending module 410 includes:

a first sending unit 411 or a second sending unit 412, where the first sending unit 411 is configured to send a connection establishment request carrying the attribute information to the network controller, where the connection establishment request is used to request establishment of a wireless control connection between the user equipment and the network controller; or the second sending unit 412 is configured to send an acknowledgement carrying the attribute information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

Figure 7:
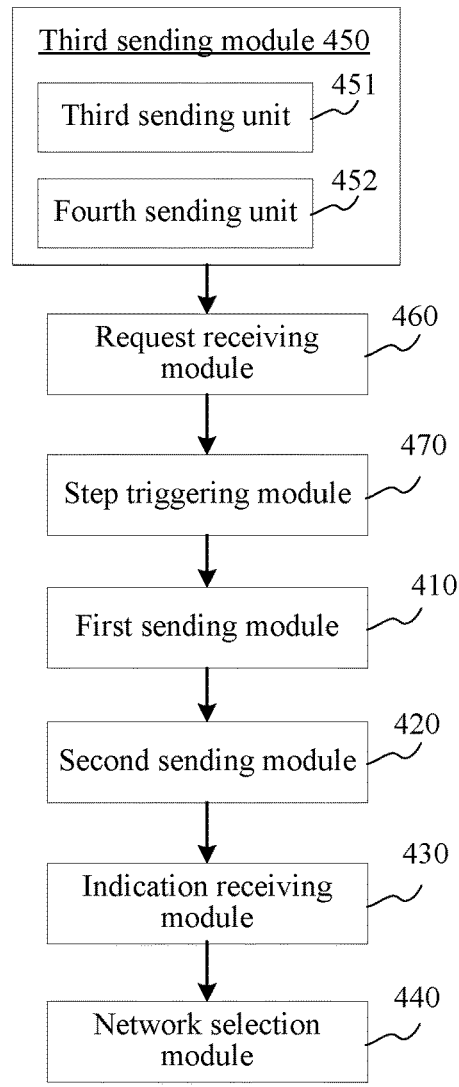
FIG. 7 is another structural block diagram of the user equipment according to Embodiment 5 of the present invention.

Referring to FIG. 7, in a third possible implementation manner of this embodiment, the first network is a wireless local area network, the second network is a 3GPP network, and the user equipment further includes a third sending module 450, a request receiving module 460, and a step triggering module 470.

The third sending module 450 is configured to send preset indication information to the network controller, where the preset indication information is used to instruct the network controller to request the attribute information from the user equipment, so that after receiving the preset indication information, the network controller sends, according to the preset indication information, an information request used to request the attribute information.

The request receiving module 460 is configured to receive the information request sent by the network controller.

The step triggering module 470 is configured to: after the request receiving module 460 receives the information request, trigger the user equipment to send the attribute information of the first network to the network controller of the second network.

In a fourth possible implementation manner of this embodiment, the third sending module 450 includes:

a third sending unit 451 or a fourth sending unit 452, where the third sending unit 451 is configured to send a connection establishment request carrying the preset indication information to the network controller, where the connection establishment request is used to request establishment of a wireless control connection between the user equipment and the network controller; or the fourth sending unit 452 is configured to send an acknowledgement carrying the preset indication information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a fifth possible implementation manner of this embodiment, the identity information includes an IP address and/or a MAC address of an access point of the first network; and the status information includes at least one of a service set identifier, security configuration information, a measurement report, load information, and a supported maximum rate.

In conclusion, the user equipment provided in this embodiment sends attribute information of a first network and quality information of service to a network controller of a second network; the network controller performs service offloading according to the received information, and feeds back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, a network status of the second network, and the quality information of service, so as to improve network utilization.

Embodiment 6

Figure 8:
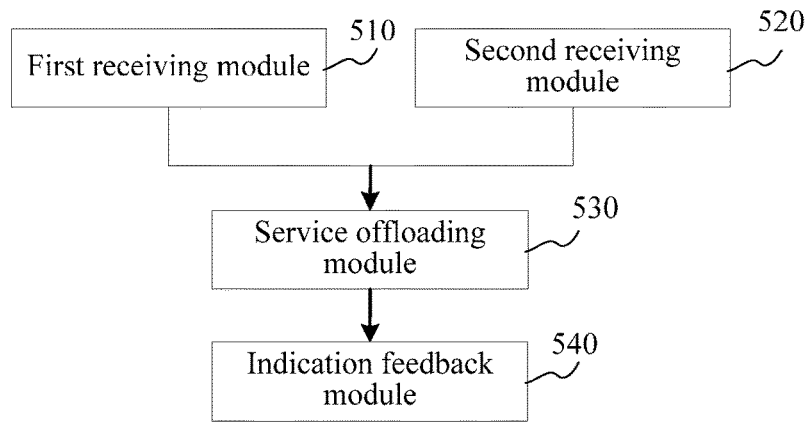
FIG. 8 is a structural block diagram of a network controller according to Embodiment 6 of the present invention.

Referring to FIG. 8, which is a structural block diagram of a network controller according to Embodiment 6 of the present invention, the network controller is a network controller of a second network. The network controller may include a first receiving module 510, a second receiving module 520, a service offloading module 530, and an indication feedback module 540.

The first receiving module 510 is configured to receive attribute information of a first network sent by user equipment, where the attribute information includes identity information of the first network or a combination of identity information and status information of the first network.

The second receiving module 520 is configured to receive quality information of service sent by the user equipment, where the quality information of service includes a correspondence between a quality of service parameter and a service.

The service offloading module 530 is configured to perform service offloading according to the received attribute information and the received quality information of service and a network status of the second network.

The indication feedback module 540 is configured to: after the service offloading module 530 performs offloading, feed back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment.

In conclusion, the network controller provided in this embodiment receives attribute information of a first network and quality information of service that are sent by user equipment connected to the first network, where the attribute information includes identity information of the first network or a combination of identity information and status information of the first network, and the quality information of service includes a correspondence between a quality of service parameter and a service; performs service offloading according to the received attribute information and the received quality information of service and a network status of a second network, and feeds back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, the network status of the second network, and the quality information of service, so as to improve network utilization.

Embodiment 7

Figure 9:
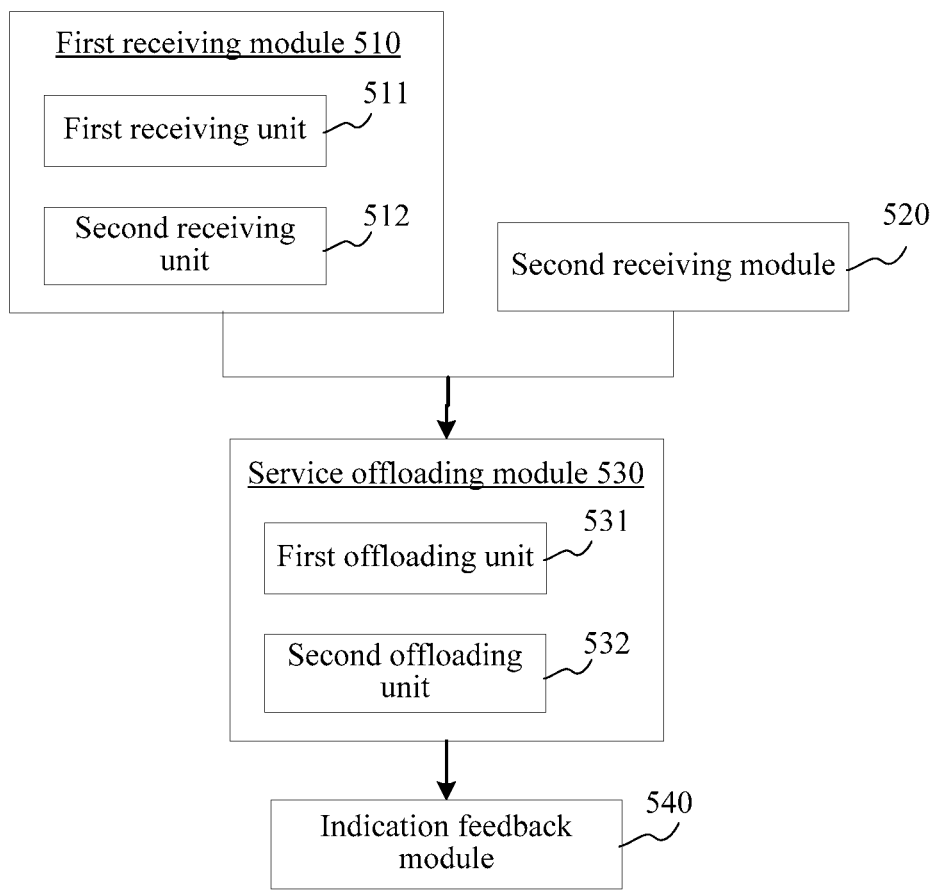
FIG. 9 is a structural block diagram of a network controller according to Embodiment 7 of the present invention.

Referring to FIG. 9, which is a structural block diagram of a network controller according to Embodiment 7 of the present invention, the network controller is a network controller of a second network. The network controller may include a first receiving module 510, a second receiving module 520, a service offloading module 530, and an indication feedback module 540.

The first receiving module 510 is configured to receive attribute information of a first network sent by user equipment, where the attribute information includes identity information of the first network or a combination of identity information and status information of the first network.

The second receiving module 520 is configured to receive quality information of service sent by the user equipment, where the quality information of service includes a correspondence between a quality of service parameter and a service.

The service offloading module 530 is configured to perform service offloading according to the received attribute information and the received quality information of service and a network status of the second network.

The indication feedback module 540 is configured to: after the service offloading module 530 performs offloading, feed back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment.

In a first possible implementation manner of this embodiment, the first receiving module 510 is further configured to receive, in a process of establishing a connection to the user equipment, the attribute information of the first network sent by the user equipment.

In a second possible implementation manner of this embodiment, the first network is a wireless local area network, the second network is a 3GPP network, and the first receiving module 510 includes:

a first receiving unit 511 or a second receiving unit 512, where the first receiving unit 511 is configured to receive a connection establishment request that carries the attribute information and is sent by the user equipment, where the connection establishment request is used to request establishment of a wireless control connection between the user equipment and the network controller; or the second receiving unit 512 is configured to receive an acknowledgement that carries the attribute information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

Figure 10:
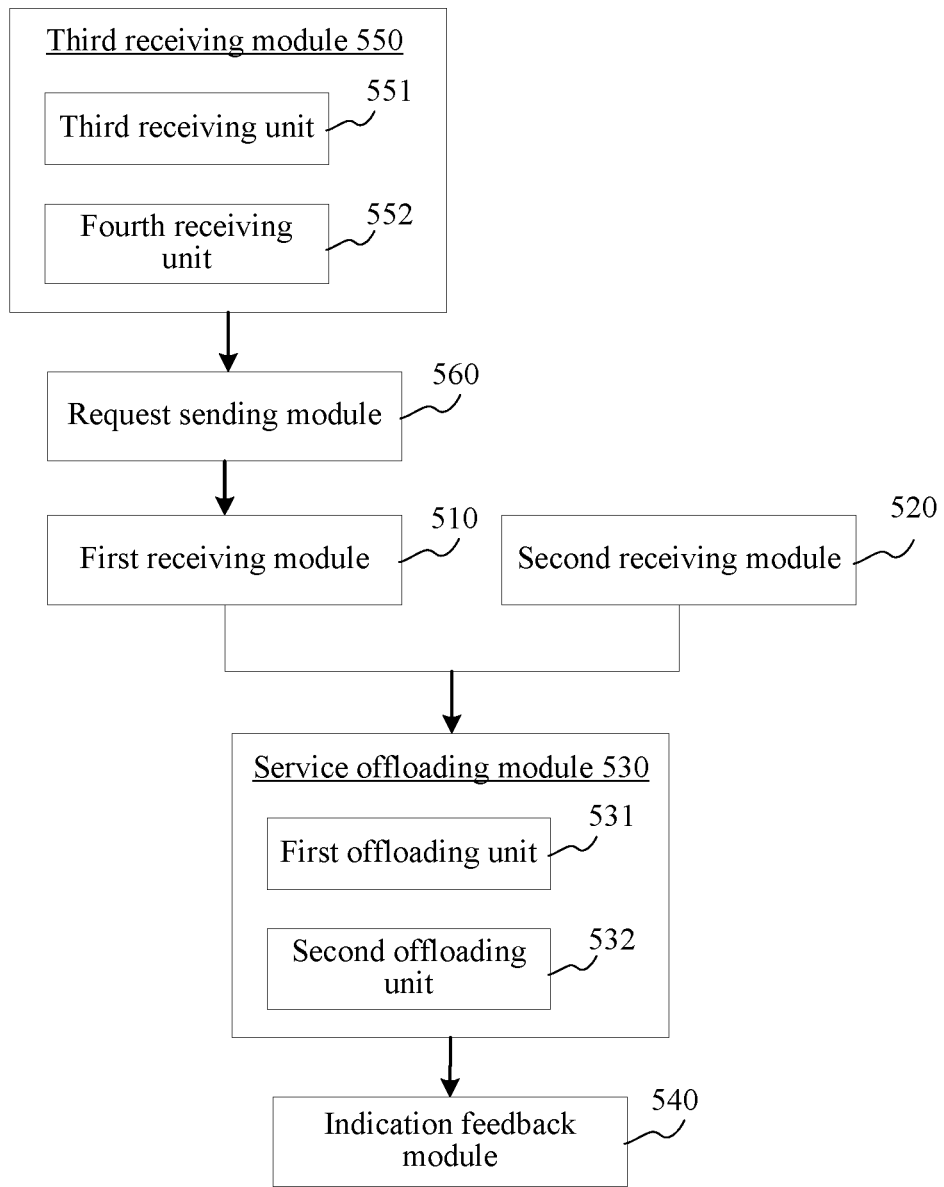
FIG. 10 is another structural block diagram of the network controller according to Embodiment 7 of the present invention.

Referring to FIG. 10, in a third possible implementation manner of this embodiment, the first network is a wireless local area network, the second network is a 3GPP network, and the network controller further includes a third receiving module 550 and a request sending module 560.

The third receiving module 550 is configured to receive preset indication information sent by the user equipment, where the preset indication information is used to instruct the network controller to request the attribute information from the user equipment.

The request sending module 560 is configured to send, according to the preset indication information received by the third receiving module 550, an information request used to request the attribute information, so that the user equipment receives the information request sent by the network controller, and after receiving the information request, sends the attribute information to the network controller.

In a fourth possible implementation manner of this embodiment, the third receiving module 550 includes:

a third receiving unit 551 or a fourth receiving unit 552, where the third receiving unit 551 is configured to receive a connection establishment request that carries the preset indication information and is sent by the user equipment, where the connection establishment request is used to request establishment of a wireless control connection between the user equipment and the network controller; or the fourth receiving unit 552 is configured to receive an acknowledgement that carries the preset indication information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a fifth possible implementation manner of this embodiment, the service offloading module 530 includes:

a first offloading unit 531 and/or a second offloading unit 532, where the first offloading unit 531 is configured to offload, according to the received attribute information and the received quality information of service and the network status of the second network, a service corresponding to a quality of service parameter less than a preset threshold onto the first network; and/or the second offloading unit 532 is configured to offload, according to the received attribute information and the received quality information of service and the network status of the second network, a service corresponding to a quality of service parameter greater than a preset threshold onto the second network.

In a sixth possible implementation manner of this embodiment, the identity information includes an IP address and/or a MAC address of an access point of the first network; and the status information includes at least one of a service set identifier, security configuration information, a measurement report, load information, and a supported maximum rate.

Figure 11:
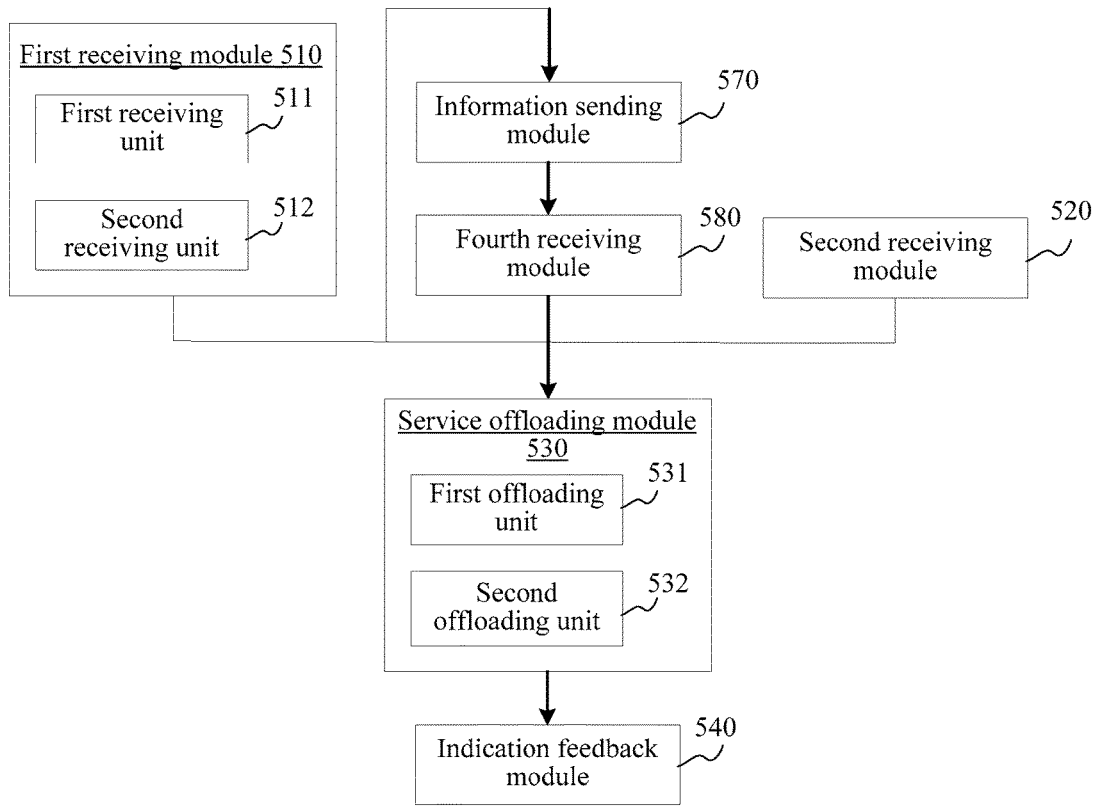
FIG. 11 is still another structural block diagram of the network controller according to Embodiment 7 of the present invention.

Referring to FIG. 11, in a seventh possible implementation manner of this embodiment, the network controller further includes an information sending module 570 and a fourth receiving module 580.

The information sending module 570 is configured to: when the attribute information received by the first receiving module includes the identity information, send request information to the access point of the first network according to the received identity information, so that after receiving the request information, the access point of the first network sends feedback information, where the feedback information includes at least one of a service set identifier, security configuration information, a measurement report, load information, and a support maximum rate.

The fourth receiving module 580 is configured to receive the feedback information sent by the access point of the first network.

Correspondingly, the service offloading module 530 is further configured to perform service offloading according to the received identity information and the received quality information of service that are sent by the user equipment, the received feedback information sent by the access point of the first network, and the network status of the second network.

In conclusion, the network controller provided in this embodiment receives attribute information of a first network and quality information of service that are sent by user equipment connected to the first network, where the attribute information includes identity information of the first network or a combination of identity information and status information of the first network, and the quality information of service includes a correspondence between a quality of service parameter and a service; performs service offloading according to the received attribute information and the received quality information of service and a network status of a second network, and feeds back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, the network status of the second network, and the quality information of service, so as to improve network utilization.

It should be noted that the user equipment described in Embodiment 4 or Embodiment 5 and the network controller described in Embodiment 6 or Embodiment 7 may form a service offloading system. For technical details of the service offloading system, refer to corresponding method embodiments, and no further details are described in this embodiment again.

Embodiment 8

Figure 12:
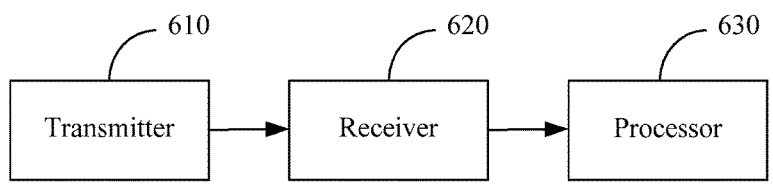
FIG. 12 is a structural block diagram of user equipment according to Embodiment 8 of the present invention.

Referring to FIG. 12, which is a structural block diagram of user equipment according to Embodiment 8 of the present invention, the user equipment accesses a first network. The user equipment includes a transmitter 610, a receiver 620, and a processor 630.

The transmitter 610 is configured to send attribute information of the first network to a network controller of a second network, where the attribute information includes identity information of the first network or a combination of identity information and status information of the first network.

The transmitter 610 is further configured to send quality information of service to the network controller of the second network, where the quality information of service includes a correspondence between a quality of service parameter and a service, so that the network controller performs service offloading according to the received attribute information and the received quality information of service and a network status of the second network, and feeds back a service offloading indication, where the service offloading indication is used to indicate a network bearing a service requested by the user equipment.

The receiver 620 is configured to receive the service offloading indication fed back by the network controller.

The processor 630 is configured to select, according to the service offloading indication received by the receiver 620, a bearer network for a service requested by the user equipment.

In conclusion, the user equipment provided in this embodiment sends attribute information of a first network and quality information of service to a network controller of a second network; the network controller performs service offloading according to the received information, and feeds back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, a network status of the second network, and the quality information of service, so as to improve network utilization.

Embodiment 9

In a more preferable embodiment of the foregoing embodiment, in this embodiment, the transmitter 610, the receiver 620, and the processor 630 may also implement the following functions:

In a first possible implementation manner, the transmitter 610 is further configured to send the attribute information of the first network to the network controller of the second network in a process of establishing a connection to the network controller.

In a second possible implementation manner, the first network is a wireless local area network, the second network is a 3rd generation partnership project 3GPP network, and the transmitter 610 is further configured to send a connection establishment request carrying the attribute information to the network controller, where the connection establishment request is used to request establishment of a wireless control connection between the user equipment and the network controller; or send an acknowledgement carrying the attribute information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a third possible implementation manner, the first network is a wireless local area network, the second network is a 3GPP network, and the transmitter 610 is further configured to send preset indication information to the network controller, where the preset indication information is used to instruct the network controller to request the attribute information from the user equipment, so that after receiving the preset indication information, the network controller sends, according to the preset indication information, an information request used to request the attribute information;

the receiver 620 is further configured to receive the information request sent by the network controller; and the processor 630 is further configured to: after the receiver 620 receives the information request, trigger the user equipment to send the attribute information of the first network to the network controller of the second network.

In a fourth possible implementation manner, the transmitter 610 is further configured to send a connection establishment request carrying the preset indication information to the network controller, where the connection establishment request is used to request establishment of a wireless control connection between the user equipment and the network controller; or send an acknowledgement carrying the preset indication information to the network controller, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a fifth possible implementation manner, the identity information includes an IP address and/or a MAC address of an access point of the first network; and the status information includes at least one of a service set identifier, security configuration information, a measurement report, load information, and a supported maximum rate.

In conclusion, the user equipment provided in this embodiment sends attribute information of a first network and quality information of service to a network controller of a second network; the network controller performs service offloading according to the received information, and feeds back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, a network status of the second network, and the quality information of service, so as to improve network utilization.

Embodiment 10

Figure 13:
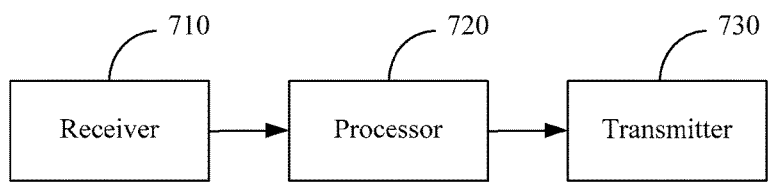
FIG. 13 is a structural block diagram of a network controller according to Embodiment 10 of the present invention.

Referring to FIG. 13, which is a structural block diagram of a network controller according to Embodiment 10 of the present invention, the network controller is a network controller of a second network. The network controller may include a receiver 710, a processor 720, and a transmitter 730.

The receiver 710 is configured to receive attribute information of a first network sent by user equipment, where the attribute information includes identity information of the first network or a combination of identity information and status information of the first network.

The receiver 710 is further configured to receive quality information of service sent by the user equipment, where the quality information of service includes a correspondence between a quality of service parameter and a service.

The processor 720 is configured to perform service offloading according to the received attribute information and the received quality information of service and a network status of the second network.

The transmitter 730 is configured to: after the processor 720 performs service offloading, feed back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment.

In conclusion, the network controller provided in this embodiment receives attribute information of a first network and quality information of service that are sent by user equipment connected to the first network, where the attribute information includes identity information of the first network or a combination of identity information and status information of the first network, and the quality information of service includes a correspondence between a quality of service parameter and a service; performs service offloading according to the received attribute information and the received quality information of service and a network status of a second network, and feeds back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, the network status of the second network, and the quality information of service, so as to improve network utilization.

Embodiment 11

In a more preferable embodiment of the foregoing embodiment, in this embodiment, the receiver 710, the processor 720, and the transmitter 730 may also implement the following functions:

In a first possible implementation manner of this embodiment, the receiver 710 is further configured to receive, in a process of establishing a connection to the user equipment, the attribute information of the first network sent by the user equipment.

In a second possible implementation manner of this embodiment, the first network is a wireless local area network, the second network is a 3GPP network, and the receiver 710 is further configured to receive a connection establishment request that carries the attribute information and is sent by the user equipment, where the connection establishment request is used to request establishment of a wireless control connection between the user equipment and the network controller; or receive an acknowledgement that carries the attribute information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a third possible implementation manner of this embodiment, the first network is a wireless local area network, the second network is a 3GPP network, and the receiver 710 is further configured to receive preset indication information sent by the user equipment, where the preset indication information is used to instruct the network controller to request the attribute information from the user equipment; and the transmitter 730 is further configured to send, according to the preset indication information received by the third receiver 710, an information request used to request the attribute information, so that the user equipment receives the information request sent by the network controller, and after receiving the information request, sends the attribute information to the network controller.

In a fourth possible implementation manner of this embodiment, the receiver 710 is further configured to receive a connection establishment request that carries the preset indication information and is sent by the user equipment, where the connection establishment request is used to request establishment of a wireless control connection between the user equipment and the network controller; or receive an acknowledgement that carries the preset indication information and is sent by the user equipment, where the acknowledgement is an acknowledgement that indicates that connection establishment succeeds and is fed back by the user equipment after the user equipment sends a connection establishment request to the network controller, and the network controller establishes a wireless control connection to the user equipment and sends configuration information related to connection establishment to the user equipment.

In a fifth possible implementation manner of this embodiment, the processor 720 is further configured to offload, according to the received attribute information and the received quality information of service and the network status of the second network, a service corresponding to a quality of service parameter less than a preset threshold onto the first network; and/or offload, according to the received attribute information and the received quality information of service and the network status of the second network, a service corresponding to a quality of service parameter greater than a preset threshold onto the second network.

In a sixth possible implementation manner of this embodiment, the identity information includes an IP address and/or a MAC address of an access point of the first network; and the status information includes at least one of a service set identifier, security configuration information, a measurement report, load information, and a supported maximum rate.

In a sixth possible implementation manner of this embodiment, the transmitter 730 is further configured to: when the attribute information received by the receiver includes the identity information, send request information to the access point of the first network according to the received identity information, so that after receiving the request information, the access point of the first network sends feedback information, where the feedback information includes at least one of a service set identifier, security configuration information, a measurement report, load information, and a support maximum rate;

the receiver 710 is further configured to receive the feedback information sent by the access point of the first network; and correspondingly, the processor 720 is further configured to perform service offloading according to the received identity information and the received quality information of service that are sent by the user equipment, the received feedback information sent by the access point of the first network, and the network status of the second network.

In conclusion, the network controller provided in this embodiment receives attribute information of a first network and quality information of service that are sent by user equipment connected to the first network, where the attribute information includes identity information of the first network or a combination of identity information and status information of the first network, and the quality information of service includes a correspondence between a quality of service parameter and a service; performs service offloading according to the received attribute information and the received quality information of service and a network status of a second network, and feeds back a service offloading indication, where the service offloading indication is used to indicate a network bearing a service requested by the user equipment, so that the user equipment receives the service offloading indication fed back by the network controller, and selects, according to the received service offloading indication, a bearer network for a service requested by the user equipment, thereby resolving a problem that because an existing service offloading method cannot well adapt to changes of a wireless environment, network utilization is low, and achieving an effect that the network controller of the second network can perform service offloading appropriately according to a network status of the first network, the network status of the second network, and the quality information of service, so as to improve network utilization.

It should be noted that the user equipment described in Embodiment 8 or Embodiment 9 and the network controller described in Embodiment 10 or Embodiment 11 may form a service offloading system. For technical details of the service offloading system, refer to corresponding method embodiments, and no further details are described in this embodiment again.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of embodiments of the present invention.

What is claimed is:

1. A service offloading method for a user equipment accessing a first network, wherein the method comprises:

sending, by the user equipment, attribute information of the first network to a network controller of a second network, wherein the attribute information comprises identity information of the first network;

sending, by the user equipment, quality information of a service to the network controller of the second network, wherein the quality information of the service comprises a correspondence between a quality of service (QoS) parameter and the service, to enable the network controller to perform service offloading according to the attribute information and the quality information of the service and a network status of the second network, and to feed back a service offloading indication, wherein the service offloading indication indicates a network for bearing a service requested by the user equipment;

receiving, by the user equipment, the service offloading indication fed back by the network controller; and selecting, by the user equipment, according to the received service offloading indication, a bearer network for the service requested by the user equipment.

2. The service offloading method according to claim 1, wherein sending the attribute information of the first network to the network controller of the second network is part of a process of establishing a connection to the network controller.

3. The service offloading method according to claim 2, wherein the first network is a wireless local area network (WLAN), the second network is a 3rd generation partnership project (3GPP) network, and wherein sending the attribute information of the first network to the network controller of the second network comprises:

sending a connection establishment request carrying the attribute information to the network controller, wherein the connection establishment request requests establishment of a wireless control connection between the user equipment and the network controller; or sending an acknowledgement carrying the attribute information to the network controller, wherein the acknowledgement indicates that connection establishment succeeds and is fed back by the user equipment after the user equipment sends a connection establishment request to the network controller and the network controller establishes a wireless control connection to the user equipment and sends configuration information related to connection establishment to the user equipment.

4. The service offloading method according to claim 1, wherein the first network is a wireless local area network (WLAN), the second network is a 3rd generation partnership project (3GPP) network, and before sending the attribute information of the first network to the network controller of the second network, the method further comprises:
sending preset indication information to the network controller, wherein the preset indication information instructs the network controller to request the attribute information from the user equipment via an information request;
receiving the information request from the network controller; and
after receiving the information request, triggering the user equipment to send the attribute information of the first network to the network controller of the second network.

5. The service offloading method according to claim 4, wherein sending the preset indication information to the network controller comprises:
sending a connection establishment request carrying the preset indication information to the network controller, wherein the connection establishment request requests establishment of a wireless control connection between the user equipment and the network controller; or
sending an acknowledgement carrying the preset indication information to the network controller, wherein the acknowledgement indicates that connection establishment succeeds and is fed back by the user equipment after the user equipment sends a connection establishment request to the network controller and the network controller establishes a wireless control connection to the user equipment and sends configuration information related to connection establishment to the user equipment.

6. The service offloading method according to claim 1, wherein the attribute information further comprises status information of the first network, wherein the status information comprises a service set identifier, security configuration information, a measurement report, load information, and/or a supported maximum rate.

7. A user equipment, comprising:
a transmitter, configured to send attribute information of a first network to a network controller of a second network, wherein the attribute information comprises identity information of the first network; and to send quality information of a service to the network controller of the second network, wherein the quality information of the service comprises a correspondence between a quality of service (QoS) parameter and the service, to enable the network controller to perform service offloading according to the attribute information and the quality information of the service and a network status of the second network, and to feed back a service offloading indication, wherein the service offloading indication indicates a network for bearing a service requested by the user equipment;
a receiver, configured to receive the service offloading indication fed back by the network controller; and
a processor, configured to select, according to the service offloading indication received by the receiver, a bearer network for the service requested by the user equipment.

8. The user equipment according to claim 7, wherein sending the attribute information of the first network to the network controller of the second network is part of a process of establishing a connection to the network controller.

9. The user equipment according to claim 8, wherein the first network is a wireless local area network (WLAN);
wherein the second network is a 3rd generation partnership project (3GPP) network; and
wherein the transmitter is further configured to:
send a connection establishment request carrying the attribute information to the network controller, wherein the connection establishment request is for requesting establishment of a wireless control connection between the user equipment and the network controller; or
send an acknowledgement carrying the attribute information to the network controller, wherein the acknowledgement indicates that connection establishment succeeds and is based on the network controller establishing a wireless control connection to the user equipment and sending configuration information related to connection establishment to the user equipment after the user equipment sends a connection establishment request to the network controller.

10. The user equipment according to claim 7, wherein the first network is a wireless local area network (WLAN);
wherein the second network is a 3rd generation partnership project (3GPP) network;
wherein the transmitter is further configured to send preset indication information to the network controller, wherein the preset indication information is for instructing the network controller to request the attribute information from the user equipment via an information request;
wherein the receiver is further configured to receive the information request from the network controller; and
wherein the processor is further configured to: after the receiver receives the information request, trigger the user equipment to send the attribute information of the first network to the network controller of the second network.

11. The user equipment according to claim 10, wherein the transmitter is further configured to:
send a connection establishment request carrying the preset indication information to the network controller, wherein the connection establishment request is for requesting establishment of a wireless control connection between the user equipment and the network controller; or
send an acknowledgement carrying the preset indication information to the network controller, wherein the acknowledgement indicates that connection establishment succeeds and is based on the network controller establishing a wireless control connection to the user equipment and sending configuration information related to connection establishment to the user equipment after the user equipment sends a connection establishment request to the network controller.

12. The user equipment according to claim 7, wherein the attribute information further comprises status information of the first network, wherein the status information comprises a service set identifier, security configuration information, a measurement report, load information, and/or a supported maximum rate.

13. A network controller of a second network, comprising:
- a receiver, configured to receive attribute information of a first network from a user equipment, wherein the attribute information comprises identity information of the first network; and to receive quality information of a service from the user equipment, wherein the quality information of the service comprises a correspondence between a quality of service (QoS) parameter and the service;
- a processor, configured to perform service offloading according to the received attribute information and the received quality information of the service and a network status of the second network; and
- a transmitter, configured to: after the processor performs service offloading, feed back a service offloading indication, wherein the service offloading indication indicates a network for bearing a service requested by the user equipment, to enable the user equipment to select, according to the received service offloading indication, a bearer network for the service requested by the user equipment.

14. The network controller according to claim 13, wherein receiving the attribute information of the first network is part of a process of establishing a connection to the user equipment.

15. The network controller according to claim 14, wherein the first network is a wireless local area network (WLAN), and the second network is a 3rd generation partnership project (3GPP) network; and
wherein the receiver is further configured to:
- receive a connection establishment request that carries the attribute information from the user equipment, wherein the connection establishment request is for requesting establishment of a wireless control connection between the user equipment and the network controller; or
- receive an acknowledgement that carries the attribute information from the user equipment, wherein the acknowledgement indicates that connection establishment succeeds and is based on the network controller establishing a wireless control connection to the user equipment and sending configuration information related to connection establishment to the user equipment after the user equipment sends a connection establishment request to the network controller.

16. The network controller according to claim 13, wherein the first network is a wireless local area network (WLAN), and the second network is a 3rd generation partnership project (3GPP) network;
wherein the receiver is further configured to receive preset indication information from the user equipment, wherein the preset indication information is for instructing the network controller to request the attribute information from the user equipment; and wherein the transmitter is further configured to send, according to the preset indication information received by the receiver, an information request used to request the attribute information.

17. The network controller according to claim 16, wherein the receiver is further configured to:
- receive a connection establishment request that carries the preset indication information from the user equipment, wherein the connection establishment request is for requesting establishment of a wireless control connection between the user equipment and the network controller; or
- receive an acknowledgement that carries the preset indication information from the user equipment, wherein the acknowledgement indicates that connection establishment succeeds and is based on the network controller establishing a wireless control connection to the user equipment and sending configuration information related to connection establishment to the user equipment after the user equipment sends a connection establishment request to the network controller.

18. The network controller according to claim 13, wherein the processor is further configured to:
- offload, according to the received attribute information and the received quality information of the service and the network status of the second network, a service corresponding to a QoS parameter less than a preset threshold onto the first network; or
- offload, according to the received attribute information and the received quality information of service and the network status of the second network, a service corresponding to a QoS parameter greater than a preset threshold onto the second network.

19. The network controller according to claim 13, wherein the attribute information further comprises status information of the first network, wherein the status information comprises a service set identifier, security configuration information, a measurement report, load information, and/or a supported maximum rate.

20. The network controller according to claim 19, wherein the transmitter is further configured to send request information to the access point of the first network according to the received identity information to enable the access point of the first network to send feedback information, wherein the feedback information comprises a service set identifier, security configuration information, a measurement report, load information, and/or a support maximum rate;
wherein the receiver is further configured to receive the feedback information from the access point of the first network; and
wherein the processor is further configured to perform service offloading according to the received identity information and the received quality information of the service from the user equipment, the received feedback information from the access point of the first network, and the network status of the second network.

* * * * *